United States Patent
Kuramoto

(10) Patent No.: US 12,525,769 B2
(45) Date of Patent: Jan. 13, 2026

(54) VERTICAL CAVITY LIGHT-EMITTING ELEMENT

(71) Applicant: STANLEY ELECTRIC CO., LTD., Tokyo (JP)

(72) Inventor: Masaru Kuramoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 793 days.

(21) Appl. No.: 17/790,954

(22) PCT Filed: Dec. 18, 2020

(86) PCT No.: PCT/JP2020/047403
§ 371 (c)(1),
(2) Date: Jul. 5, 2022

(87) PCT Pub. No.: WO2021/140871
PCT Pub. Date: Jul. 15, 2021

(65) Prior Publication Data
US 2023/0044637 A1    Feb. 9, 2023

(30) Foreign Application Priority Data
Jan. 8, 2020 (JP) ................................. 2020-001533

(51) Int. Cl.
*H01S 5/183* (2006.01)
*H01S 5/30* (2006.01)

(52) U.S. Cl.
CPC ...... *H01S 5/18369* (2013.01); *H01S 5/18347* (2013.01); *H01S 5/3013* (2013.01)

(58) Field of Classification Search
CPC ............ H01S 5/18–887; H01S 5/0207; H01S 5/0287; H01S 5/04253–04257;
(Continued)

(56) References Cited

U.S. PATENT DOCUMENTS 8,509,277 B2 * 8/2013 Hattori ................ H01S 5/04254
372/50.121
9,929,536 B1 3/2018 Lin et al.
(Continued)

FOREIGN PATENT DOCUMENTS

CA    3072760 A1    2/2019
CN    102136676 A    7/2011
(Continued)

OTHER PUBLICATIONS

International Search Report (ISR) (and English translation thereof) dated Mar. 9, 2021, issued in International Application No. PCT/JP2020/047403.
(Continued)

*Primary Examiner* — Xinning (Tom) Niu
*Assistant Examiner* — Delma R Forde
(74) *Attorney, Agent, or Firm* — Holtz, Holtz & Volek PC

(57) ABSTRACT

A vertical cavity light-emitting element includes a substrate, a first multilayer reflector, a semiconductor structure layer, an electrode layer, and a second multilayer reflector. The semiconductor structure layer includes a first semiconductor layer of a first conductivity type on the first multilayer reflector, a light-emitting layer on the first semiconductor layer, and a second semiconductor layer of a second conductivity type on the light-emitting layer. The electrode layer is on an upper surface of the semiconductor structure layer and is electrically in contact with the second semiconductor layer in one region of the upper surface. The second multilayer reflector covers the one region on the electrode layer and constitutes a resonator with the first multilayer reflector. The semiconductor structure layer has one recessed structure including one or a plurality of recessed portions passing through the light-emitting from the upper surface in a region surrounding the one region.

14 Claims, 16 Drawing Sheets

(58) Field of Classification Search
CPC .. H01S 5/3013; H01S 5/320275; H01S 5/323; H01S 5/34333; H01S 5/18305; H01S 5/18341; H01S 5/18347; H01S 5/18355; H01S 5/18369; H01S 2301/176
See application file for complete search history.

(56) References Cited

U.S. PATENT DOCUMENTS

| | | | |
|---|---|---|---|
| 11,095,096 B2 * | 8/2021 | Han | H01L 21/02203 |
| 2006/0187997 A1 | 8/2006 | Ezaki et al. | |
| 2008/0179605 A1 * | 7/2008 | Takase | H10H 20/8142 |
| | | | 257/E33.068 |
| 2008/0279241 A1 | 11/2008 | Oki et al. | |
| 2011/0182315 A1 | 7/2011 | Shiozaki et al. | |
| 2011/0228035 A1 | 9/2011 | Ishii et al. | |
| 2013/0214284 A1 | 8/2013 | Holder et al. | |
| 2015/0303655 A1 | 10/2015 | Han et al. | |
| 2017/0271847 A1 | 9/2017 | Tanaka et al. | |
| 2018/0166855 A1 * | 6/2018 | Takeuchi | H01L 21/02507 |
| 2018/0366906 A1 | 12/2018 | Hamaguchi et al. | |
| 2019/0173263 A1 | 6/2019 | Hamaguchi et al. | |
| 2019/0229496 A1 | 7/2019 | Izumi et al. | |
| 2019/0273360 A1 | 9/2019 | Kawashima et al. | |
| 2019/0355786 A1 | 11/2019 | Iguchi | |
| 2019/0363515 A1 | 11/2019 | Kuramoto et al. | |
| 2020/0169065 A1 | 5/2020 | Carson et al. | |
| 2021/0083454 A1 | 3/2021 | Nakata et al. | |
| 2021/0194217 A1 | 6/2021 | Carson et al. | |
| 2021/0226420 A1 * | 7/2021 | Aoki | H01S 5/185 |
| 2021/0273412 A1 * | 9/2021 | Feezell | H01S 5/18347 |
| 2021/0351568 A1 | 11/2021 | Kuramoto | |
| 2021/0384706 A1 | 12/2021 | Kuramoto et al. | |
| 2022/0140570 A1 | 5/2022 | Kuramoto et al. | |
| 2022/0149595 A1 | 5/2022 | Kuramoto et al. | |
| 2022/0393436 A1 * | 12/2022 | Tsuda | H01S 5/18377 |
| 2024/0380173 A1 * | 11/2024 | Takeuchi | H01S 5/183 |
| 2025/0047073 A1 * | 2/2025 | Akagi | H01S 5/18341 |
| 2025/0167522 A1 * | 5/2025 | Kuramoto | H01S 5/34333 |

FOREIGN PATENT DOCUMENTS

| | | |
|---|---|---|
| JP | 2004128351 A | 4/2004 |
| JP | 2006196830 A | 7/2006 |
| JP | 2008270432 A | 11/2008 |
| JP | 2013058687 A | 3/2013 |
| JP | 2013158687 A | 8/2013 |
| JP | 2014007293 A | 1/2014 |
| JP | 2014096515 A | 5/2014 |
| JP | 2017098328 A | 6/2017 |
| JP | 2019135748 A | 8/2019 |
| WO | 2015194244 A1 | 12/2015 |
| WO | 2017018017 A1 | 2/2017 |
| WO | 2018020791 A1 | 2/2018 |
| WO | 2018037679 A1 | 3/2018 |
| WO | 2018230230 A1 | 12/2018 |

OTHER PUBLICATIONS

Written Opinion dated Mar. 9, 2021, issued in International Application No. PCT/JP2020/047403.
U.S. Appl. No. 17/633,486, First Named Inventor: Keisuke Nakata; Title: "Vertical Cavity Light-Emitting Element"; Filed: Feb. 7, 2022.
Extended European Search Report (EESR) dated Apr. 26, 2024, issued in counterpart European Application No. 20912937.8.
Japanese Office Action (and an English language translation thereof) dated Aug. 27, 2024, issued in counterpart Japanese Application No. 2021-569805.
Extended European Search Report (EESR) dated Jan. 28, 2025, issued in counterpart European Application No. 24196996.3.
Partial Supplementary European Search Report dated Jan. 8, 2024 in counterpart European Application No. 20912937.8.
Chinese Office Action (and an English language translation thereof) dated Mar. 28, 2025, issued in counterpart Chinese Application No. 202080092170.0.
Japanese Office Action (and an English language translation thereof) dated Jul. 1, 2025, issued in counterpart Japanese Application No. 2024-174188.
Chinese Notice of Allowance (and an English language translation thereof) together with a Search Report dated Jul. 4, 2025, issued in counterpart Chinese Application No. 202080092170.0.
Japanese Office Action (and an English language translation thereof) dated Oct. 7, 2025, issued in counterpart Japanese Application No. 2024-174188.

* cited by examiner

VERTICAL CAVITY LIGHT-EMITTING ELEMENT

TECHNICAL FIELD

The present invention relates to a vertical cavity light-emitting element, such as a vertical cavity surface emitting laser (VCSEL).

BACKGROUND ART

Conventionally, as one of semiconductor lasers, there has been known a vertical cavity-type semiconductor surface emitting laser (hereinafter also simply referred to as a surface emitting lase) including a semiconductor layer that emits a light by application of voltage and multilayer reflectors opposed to one another with the semiconductor layer interposed therebetween. For example, Patent Document 1 discloses a vertical cavity-type semiconductor laser having an n-electrode and a p-electrode each connected to an n-type semiconductor layer and a p-type semiconductor layer.

CITATION LIST

Patent Literature

Patent Document 1: Japanese Unexamined Patent Application Publication No. 2017-98328

DISCLOSURE OF THE INVENTION

Problems to be Solved by the Invention

For example, an optical resonator is formed with opposed reflectors in a vertical cavity light-emitting element such as a surface emitting laser. For example, in the surface emitting laser, by application of voltage to a semiconductor layer via electrodes, a light emitted from the semiconductor layer resonates in the optical resonator to generate a laser light.

However, as an example of a problem, for example, a vertical cavity-type semiconductor laser element has luminous efficiency lower than that of a horizontal cavity-type semiconductor laser element having a resonator in an in-plane direction of a semiconductor layer including an active layer.

The present invention has been made in consideration of the above-described points and it is an object to provide a vertical cavity light-emitting element having the high luminous efficiency.

Solutions to the Problems

A vertical cavity light emitting element of the present invention includes a substrate, a first multilayer reflector, a semiconductor structure layer, an electrode layer, and a second multilayer reflector. The first multilayer reflector is formed on the substrate. The semiconductor structure layer includes a first semiconductor layer, a light-emitting layer, and a second semiconductor layer. The first semiconductor layer has a first conductivity type formed on the first multilayer reflector. The light-emitting layer is formed on the first semiconductor layer. The second semiconductor layer is formed on the light-emitting layer and has a second conductivity type opposite to the first conductivity type. The electrode layer is formed on an upper surface of the semiconductor structure layer and is electrically in contact with the second semiconductor layer of the semiconductor structure layer in one region of the upper surface. The second multilayer reflector is formed to cover the one region on the electrode layer and constitutes a resonator with the first multilayer reflector. The semiconductor structure layer has one recessed structure including one or a plurality of recessed portions passing through the light-emitting from the upper surface in a region surrounding the one region.

DESCRIPTION OF PREFERRED EMBODIMENTS

The following describes embodiments of the present invention in detail. While, in the following description, a description will be made using a semiconductor surface emitting laser element (a semiconductor laser) as an example, the present invention is applicable not only to a surface emitting laser but also to various kinds of vertical cavity light-emitting elements, such as a vertical cavity-type light-emitting diode.

Embodiment 1

Figure 1:
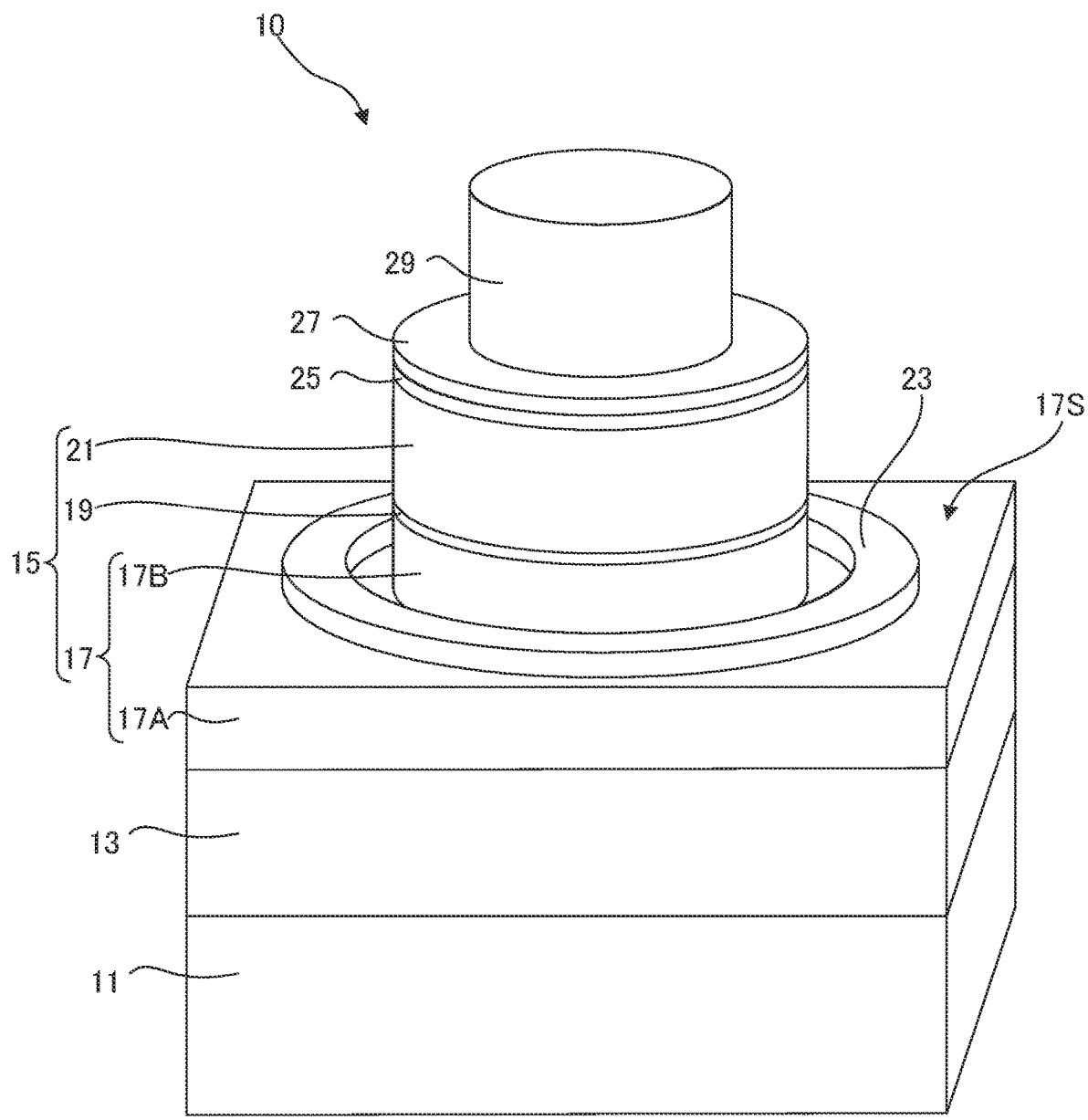
FIG. 1 is a perspective view of a surface emitting laser according to a first embodiment.

FIG. 1 is a perspective view of a vertical cavity surface emitting laser (VCSEL, hereinafter also simply referred to as a surface emitting laser) 10 according to Embodiment 1.

A substrate 11 is a gallium-nitride-based semiconductor substrate, for example, a GaN substrate. The substrate 11 is, for example, a substrate having a rectangular upper surface shape. On the substrate 11, a first multilayer reflector 13 made of a semiconductor layer that has been grown on the substrate 11 is formed.

The first multilayer reflector 13 is a semiconductor multilayer reflector in which a low refractive-index semiconductor film having a composition of AlInN and a high refractive-index semiconductor film having a GaN composition and having a refractive index higher than that of the low refractive-index semiconductor film are alternately laminated. In other words, the first multilayer reflector 13 is a Distributed Bragg Reflector (DBR) made of a semiconductor material. For example, on an upper surface of the substrate 11, a buffer layer having the GaN composition is disposed, and alternately forming films of the high refractive-index semiconductor film and the low refractive-index semiconductor film described above on the buffer layer forms the first multilayer reflector 13.

Note that the upper surface of the substrate 11, that is, the surface on which the buffer layer having the GaN composition is disposed is preferred to be a C-plane or a surface offset by within 0.5° from the C-plane. This is for providing, for example, satisfactory crystallinity of a semiconductor structure layer 15, which will be described later.

The semiconductor structure layer 15 is a laminated structure made of a plurality of semiconductor layers formed on the first multilayer reflector 13. The semiconductor structure layer 15 has an n-type semiconductor layer (a first semiconductor layer) 17 formed on the first multilayer reflector 13, a light-emitting layer (or an active layer) 19 formed on the n-type semiconductor layer 17, and a p-type semiconductor layer (a second semiconductor layer) 21 formed on the active layer 19.

The n-type semiconductor layer 17 is a semiconductor layer formed on the first multilayer reflector 13. The n-type semiconductor layer 17 is a semiconductor layer that has the GaN composition and is doped with Si as n-type impurities. The n-type semiconductor layer 17 has a prismatic-shaped lower portion 17A and a column-shaped upper portion 17B disposed on the lower portion 17A. Specifically, for example, the n-type semiconductor layer 17 has the column-shaped upper portion 17B projecting from an upper surface 17S of the prismatic-shaped lower portion 17A. In other words, the n-type semiconductor layer 17 has a mesa-shaped structure including the upper portion 17B.

The active layer 19 is a layer that is formed on the upper portion 17B of the n-type semiconductor layer 17 and has a quantum well structure including a well layer having an InGaN composition and a barrier layer having the GaN composition. In a surface emitting laser 10, a light is generated in the active layer 19.

The p-type semiconductor layer 21 is a semiconductor layer having the GaN composition formed on the active layer 19. The p-type semiconductor layer 21 is doped with Mg as p-type impurities.

An n-electrode 23 is a metal electrode that is disposed on the upper surface 17S of the lower portion 17A of the n-type semiconductor layer 17 and is electrically connected to the n-type semiconductor layer 17. The n-electrode 23 is formed into a ring shape so as to surround the upper portion 17B of the n-type semiconductor layer 17.

An insulating layer 25 is a layer made of an insulator formed on the p-type semiconductor layer 21. The insulating layer 25 is formed of, for example, a substance having a refractive index lower than that of a material forming the p-type semiconductor layer 21, such as $SiO_2$. The insulating layer 25 is formed into a ring shape on the p-type semiconductor layer 21 and is provided with an opening (not illustrated) that exposes the p-type semiconductor layer 21 at the center portion.

A p-electrode 27 is a metal electrode formed on the insulating layer 25. The p-electrode 27 is electrically connected to an upper surface of the p-type semiconductor layer 21 exposed from the above-described opening of the insulating layer 25 via a transparent electrode (not illustrated) made of a metal oxide film, such as ITO or IZO.

A second multilayer reflector 29 is a dielectric multilayer reflector in which a low refractive index dielectric film made of $Al_2O_3$ and a high refractive index dielectric film made of $Ta_2O_5$ and having a refractive index higher than that of the low refractive index dielectric film are alternately laminated. In other words, the second multilayer reflector 29 is the Distributed Bragg Reflector (DBR) made of a dielectric material.

Figure 2:
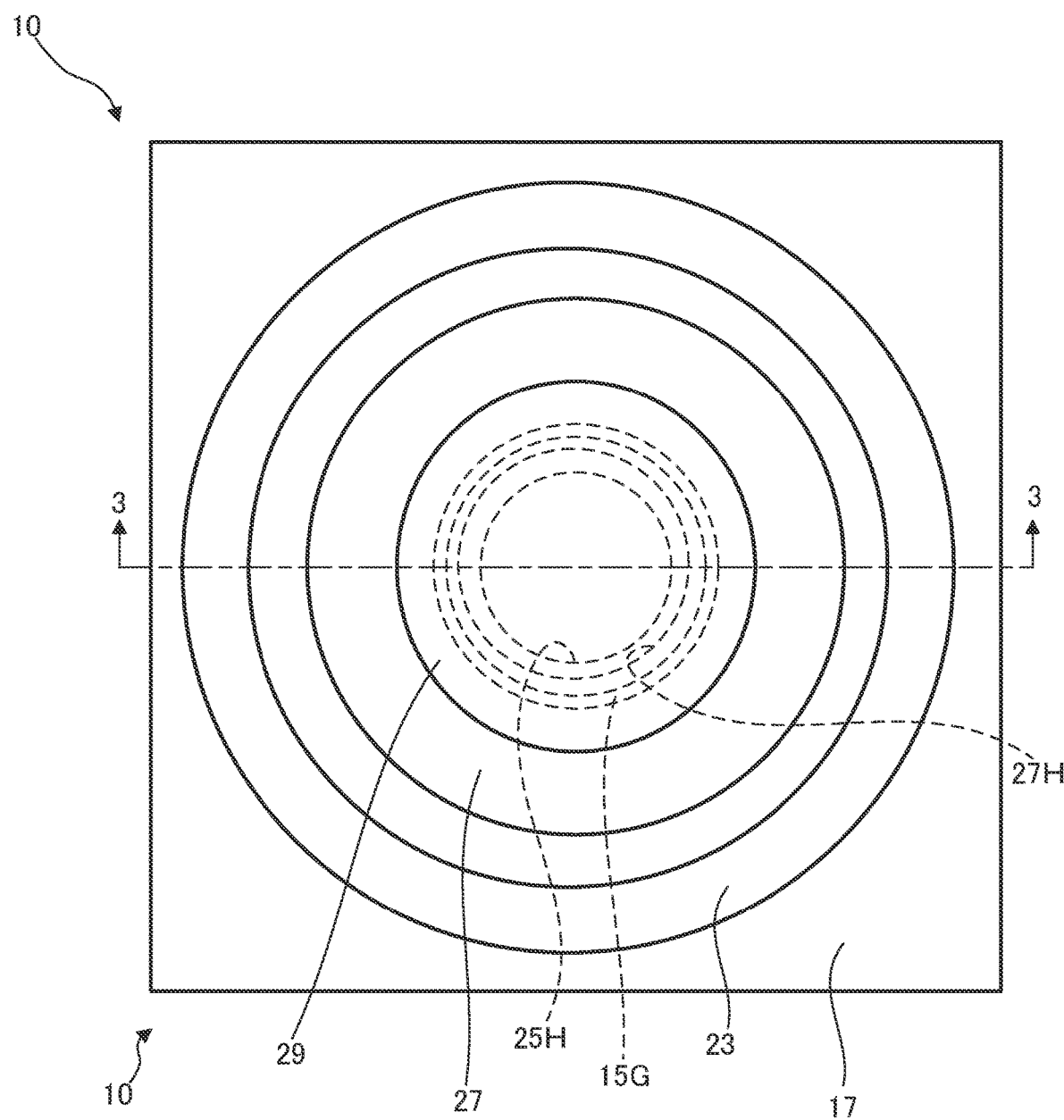
FIG. 2 is a top view of the surface emitting laser according to the first embodiment.

FIG. 2 is a top view of the surface emitting laser 10. As described above, the surface emitting laser 10 has the semiconductor structure layer 15 including the n-type semiconductor layer 17 formed on the substrate 11 having the rectangular upper surface shape, the active layer 19 having the circular-shaped upper surface, and the p-type semiconductor layer 21 (see FIG. 1). On the p-type semiconductor layer 21, the insulating layer 25 and the p-electrode 27 are formed. On the p-electrode 27, the second multilayer reflector 29 is formed.

The insulating layer 25 has an opening 25H as a circular-shaped opening that exposes the p-type semiconductor layer 21 of the above-described insulating layer 25. As illustrated in FIG. 2, the opening 25H is formed at the center of the insulating layer 25 when viewed from an upper side of the surface emitting laser 10 and is covered with the second multilayer reflector 29 when viewed from the upper side of the surface emitting laser 10. In other words, the opening 25H is covered with the second multilayer reflector 29 in the upper surface of the p-type semiconductor layer 21. Yet in other words, the opening 25H is formed in a region opposed to a lower surface of the multilayer reflector 29 of the insulating layer 25.

The p-electrode 27 is formed at the center of the insulating layer 25 when viewed from the upper side of the surface emitting laser 10 and has an opening 27H that surrounds the opening 25H. That is, the opening 27H is an opening larger than the opening 25H. For example, the opening 27H has a circular shape concentric to the shape of the opening 25H.

As illustrated by the dashed line in FIG. 2, a groove 15G in a circular ring shape is formed on the upper surface of the p-type semiconductor layer 21, that is, the upper surface of the semiconductor structure layer 15. The groove 15G is formed in an outside region of the opening 25H and the opening 27H. That is, the groove 15G is a groove provided in a ring shape when viewed from a direction perpendicular to an in-plane direction of the semiconductor structure layer 15.

In this embodiment, the groove 15G is formed so as to be covered by the second multilayer reflector 29 on the upper surface of the p-type semiconductor layer 21. That is, in this embodiment, the groove 15G is formed at a position opposed to a lower surface of the second multilayer reflector 29.

Figure 3:
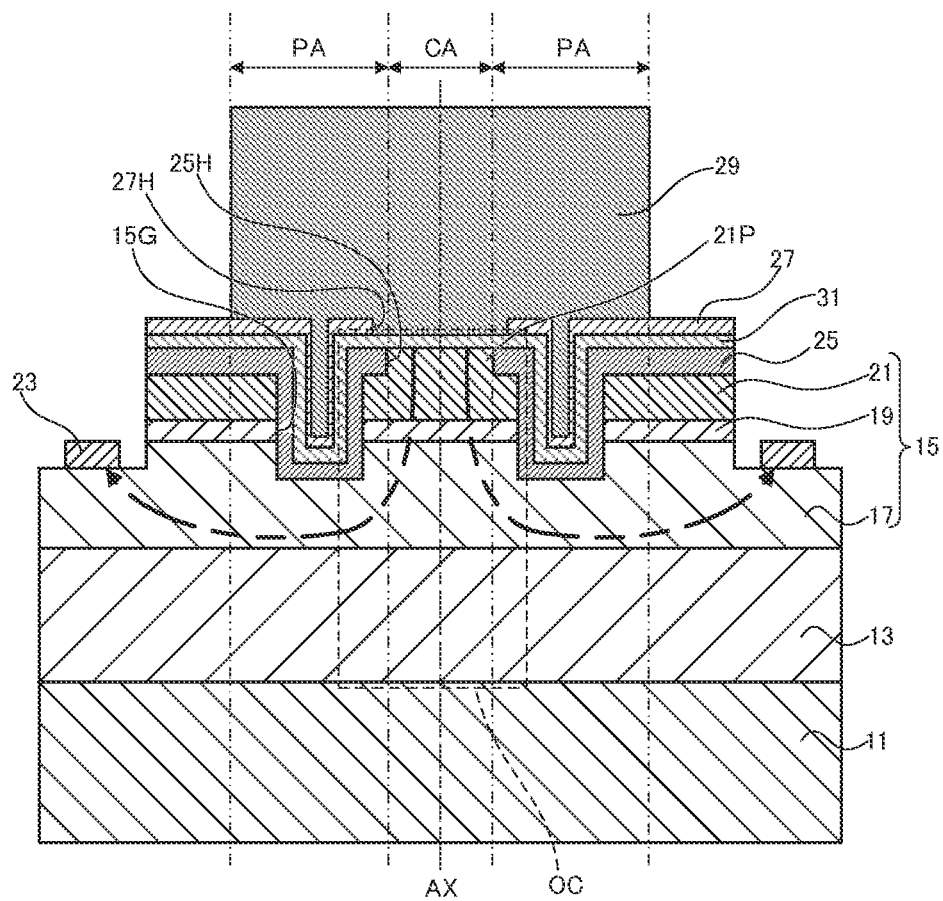
FIG. 3 is a cross-sectional view of the surface emitting laser according to the first embodiment.

FIG. 3 is a cross-sectional view of the surface emitting laser 10 taken along the line 3-3 in FIG. 2. As described above, the surface emitting laser 10 has the substrate 11 as the GaN substrate, and the first multilayer reflector 13 is formed on the substrate 11. Note that a lower surface of the substrate 11 may be applied with an AR coating.

The semiconductor structure layer 15 is formed on the first multilayer reflector 13. The semiconductor structure layer 15 is a laminated body made by forming the n-type semiconductor layer 17, the active layer 19, and the p-type semiconductor layer 21 in this order.

The groove 15G formed in the semiconductor structure layer 15 is formed so as to surround a projecting portion 21P projecting at the center on the upper surface of the p-type semiconductor layer 21 and passes through the active layer 19 from the upper surface of the p-type semiconductor layer 21 to reach the n-type semiconductor layer 17.

Thus, in the surface emitting laser 10 according to Embodiment 1, the groove 15G is formed so as to pass through the active layer 19. In other words, the groove 15G forms a clearance in the active layer 19.

The insulating layer 25 is formed so as to cover the upper surface of the p-type semiconductor layer 21 and an inner surface of the groove 15G. As described above, the insulating layer 25 is made of a material having a refractive index lower than that of the p-type semiconductor layer 21. The insulating layer 25 has the opening 25H that exposes the projecting portion 21P. For example, as illustrated in FIG. 2, the opening 25H is in a circular shape. For example, the opening 25H and the projecting portion 21P have similar shapes, and an inner surface of the opening 25H and an outer surface of the projecting portion 21P are in contact with one another.

A light transmissive electrode layer 31 is a layer made of a conductive body having translucency formed so as to cover the insulating layer 25 and the projecting portion 21P exposed from the opening 25H of the insulating layer 25. That is, the light transmissive electrode layer 31 is electrically in contact with the p-type semiconductor layer 21 in a region exposed by the opening 25H on the upper surface of the p-type semiconductor layer 21. The light transmissive electrode layer 31 is formed of, for example, a metal oxide having translucency relative to an emitted light from the active layer 19, such as ITO or IZO.

As described above, the p-electrode 27 is the metal electrode and is formed so as to cover the light transmissive electrode layer 31. That is, the p-electrode 27 is electrically in contact with the light transmissive electrode layer 31. Accordingly, the p-electrode 27 is electrically in contact with or electrically connected to the p-type semiconductor layer 21 via the light transmissive electrode layer 31 in a region exposed by the opening 25H on the upper surface of the p-type semiconductor layer 21. The p-electrode 27 has the opening 27H that exposes the light transmissive electrode layer 31 at the center. The opening 27H is an opening with a width larger than that of the opening 25H.

The second multilayer reflector 29 is formed so as to cover the opening 27H and the groove 15G. The second multilayer reflector 29 is formed so as to fill a space formed of the opening 27H and so as to be in contact with the light transmissive electrode layer 31. The second multilayer reflector 29 is formed so as to fill a space formed of the groove 15G.

In the surface emitting laser 10, the first multilayer reflector 13 has reflectivity slightly lower than that of the second multilayer reflector 29. Accordingly, a part of the light resonated between the first multilayer reflector 13 and the second multilayer reflector 29 transmits through the first multilayer reflector 13 and the substrate 11 to be taken out to the outside.

As described above, in the surface emitting laser 10 according to Embodiment 1, the groove 15G is formed so as to pass through the active layer 19. In other words, the groove 15G forms the clearance in the active layer 19. The groove 15G is formed after the semiconductor structure layer 15 is formed. Afterwards, the insulating layer 25 is formed before the light transmissive electrode layer 31, the p-electrode 27, and the second multilayer reflector 29 are formed.

Accordingly, after the semiconductor structure layer 15 is formed, forming the groove 15G that reaches the active layer 19 forms a space or the clearance in a direction along an in-plane of the active layer 19. This clearance reduces a distortion generated in an in-layer direction of the active layer 19 or in a layer surface direction of the semiconductor structure layer 15 when the active layer 19 is formed.

Specifically speaking, the active layer 19 has a crystalline structure distorted by a difference of lattice constants between InGaN and GaN forming the quantum well structure when the active layer 19 is formed to cause a piezoelectric polarization to cause a piezoelectric field. The generation of this piezoelectric field lowers a recombination probability of the electrons and the holes injected to the light-emitting layer to contribute to lower the internal quantum efficiency.

In the surface emitting laser 10, the groove 15G reaching the active layer 19 is formed in the semiconductor structure layer 15. The clearance by this groove is considered to reduce the distortion generated in the in-layer direction of the active layer 19 during the growth of the active layer 19, and thus, the internal quantum efficiency in the active layer 19 is improved.

Here, an operation of the surface emitting laser 10 will be described. In the surface emitting laser 10, when a voltage is applied between the n-electrode 23 and the p-electrode 27, a current flows inside the semiconductor structure layer 15 as indicated by the one-dot chain bold line in the drawing, and the light is emitted from the active layer 19. The light emitted from the active layer 19 is repeatedly reflected between the first multilayer reflector 13 and the second multilayer reflector 29 to reach a resonant state (to laser oscillate).

In the surface emitting laser 10, the current is injected only from a portion exposed by the opening 25H to the p-type semiconductor layer 21. Since the p-type semiconductor layer 21 is considerably thin, the current hardly spreads in the in-plane direction, that is, the direction along the in-plane of the semiconductor structure layer 15 inside the p-type semiconductor layer 21. Accordingly, in the surface emitting laser 10, the current is supplied only to the region immediately below the opening 25H in the active layer 19, and the light is emitted only from this region. That is, in the surface emitting laser 10, the opening 25H has a current confinement structure that restricts a supply range of the current in the active layer 19.

As described above, in the embodiment, the first multilayer reflector 13 has the reflectivity slightly lower than that of the second multilayer reflector 29. Accordingly, a part of the light resonated between the first multilayer reflector 13 and the second multilayer reflector 29 transmits through the first multilayer reflector 13 and the substrate 11 to be taken out to the outside. Thus, the surface emitting laser 10 emits the light from the lower surface of the substrate 11 toward the direction perpendicular to the lower surface of the substrate 11 and the in-plane direction of the respective layers of the semiconductor structure layer 15.

The projecting portion 21P of the p-type semiconductor layer 21 of the semiconductor structure layer 15 and the opening 25H of the insulating layer 25 define a luminescence center as a center of a light emission region in the active layer 19 to define a center axis (a luminescence center axis) AX of a resonator OC. The center axis AX of the resonator OC passes through a center of the projecting portion 21P of the p-type semiconductor layer 21 and extends along a direction perpendicular to the in-plane direction of the semiconductor structure layer 15.

Note that the light emission region of the active layer 19 means, for example, a region having a predetermined width from which a light having a predetermined intensity or more is emitted in the inside of the active layer 19, and its center is the luminescence center. For example, the light emission region of the active layer 19 means is a region to which a current having a predetermined density or more is injected in the inside of the active layer 19, and its center is the luminescence center. A straight line that passes through the luminescence center and is perpendicular to the upper surface of the substrate 11 or the in-plane direction of the respective layers of the semiconductor structure layer 15 is the center axis AX. The luminescence center axis AX is a straight line extending along a resonator length direction of the resonator OC constituted of the first multilayer reflector 13 and the second multilayer reflector 29. The center axis AX corresponds to an optical axis of the laser light emitted from the surface emitting laser 10.

Here, exemplary configurations of respective layers of the first multilayer reflector 13, the semiconductor structure layer 15, and the second multilayer reflector 29 and exemplary dimensions of the groove 15G in the surface emitting laser 10 will be described. In the embodiment, the first multilayer reflector 13 is made of a GaN base layer of 1 µm and 42 pairs of n-GaN layers and AlInN layers formed on the upper surface of the substrate 11.

The n-type semiconductor layer 17 is an n-GaN layer having a layer thickness of 1580 nm. The active layer 19 is made of an active layer having a multiple quantum well structure in which four pairs of GaInN layers of 4 nm and GaN layers of 5 nm are laminated. On the active layer 19, an AlGaN electronic barrier layer doped with Mg is formed, and the p-type semiconductor layer 21 made of a p-GaN layer of 50 nm is formed thereon. The second multilayer reflector 29 is a lamination of 10.5 pairs of $Nb_2O_5$ and $SiO_2$. The resonant wavelength in this case was 440 nm.

The groove portion 15G formed in the semiconductor structure layer 15 has an outer diameter of 8 µm, a depth of 120 nm, and a width of 2 µm. The light transmissive electrode layer 31 formed on the semiconductor structure layer 15 is a layer made of ITO of 20 nm, and the second multilayer reflector 29 is formed on the light transmissive electrode layer 31 and the p-electrode 27 with a spacer layer of $Nb_2O_5$ of 40 nm interposed.

A back surface of the substrate 11 is a polished surface, and two layers of AR coatings of $Nb_2O_5$ and $SiO_2$ are formed on this polished surface.

The p-type semiconductor layer 21 may have a layer thickness of 50 nm in the projecting portion 21P and a layer thickness of 30 nm in the other portions. That is, the p-type semiconductor layer 21 may have different layer thicknesses in the projecting portion 21P and the other regions. The insulating layer 25 has an upper surface configured to be arranged at a height position identical to an upper surface of the projecting portion 21P of the p-type semiconductor layer 21. These are merely one example.

The following describes optical features inside the surface emitting laser 10. As described above, in the surface emitting laser 10, the insulating layer 25 has a refractive index lower than that of the p-type semiconductor layer 21. Layer thicknesses of the other layers between the first multilayer reflector 13 and the second multilayer reflector 29 are the same at any positions in the plane insofar as in the same layer.

Accordingly, an equivalent refractive index (an optical distance between the first multilayer reflector 13 and the second multilayer reflector 29, and corresponds to a resonant wavelength) in the resonator OC formed between the first multilayer reflector 13 and the second multilayer reflector 29 of the surface emitting laser 10 differs in a column-shaped central region CA having an upper surface shape defined by the opening 25H and in a pipe-shaped peripheral region PA around the central region CA by a difference in refractive indexes between the p-type semiconductor layer 21 and the insulating layer 25.

Specifically, between the first multilayer reflector 13 and the second multilayer reflector 29, the equivalent refractive index in the peripheral region PA is lower than the equivalent refractive index in the central region, that is, an equivalent resonant wavelength in the central region CA is smaller than the equivalent resonant wavelength in the peripheral region PA. Note that, as described above, where the light is emitted in the active layer 19 is the region immediately below the opening 25H. That is, the light emission region where the light is emitted in the active layer 19 is a portion overlapping with the central region CA in the active layer 19, in other words, a region inside the opening 25H of the insulating layer 25 in top view.

Thus, in the surface emitting laser 10, the central region CA including the light emission region of the active layer 19 and the peripheral region PA that surrounds the central region CA and has the refractive index lower than that of the central region CA are formed. This reduces an optical loss by diffusion (radiation) of a standing wave within the central region CA into the peripheral region PA. That is, a large amount of light remains in the central region CA, and a laser light LB is taken out to the outside in this state. Accordingly, the large amount of light concentrates in the central region CA in the peripheral area of the luminescence center axis AX of the resonator OC to ensure generating and emitting a laser light with high output and high density.

As described above, in the surface emitting laser 10 of the embodiment, the groove 15G that reaches the active layer 19 from the upper surface of the p-type semiconductor layer 21 is formed in the semiconductor structure layer 15. With this groove 15G, the distortion generated in the in-layer direction of the active layer 19 is reduced in the active layer 19, and the internal quantum efficiency in the active layer 19 is improved, thereby ensuring achieving improved luminous efficiency.

(Manufacturing Method)

The following describes one example of a method for manufacturing the surface emitting laser 10. First, a c-plane n-GaN substrate is prepared as the substrate 11, and an n-GaN layer (a layer thickness of 1 µm) is formed as a base layer on the substrate by Metal-Organic Vapor Phase Epitaxy method (MOVPE). Subsequently, 42 pairs of n-GaN/AlInN layers are film-formed on the base layer to form the first multilayer reflector 13.

Next, the active layer 19 is formed by forming Si-doped n-GaN (a layer thickness of 1580 nm) on the first multilayer reflector 13 to form the n-type semiconductor layer 17 and then, laminating four pairs of layers made of GaInN (a layer thickness of 4 nm) and GaN (a layer thickness of 5 nm) on the n-type semiconductor layer 17.

Next, the electronic barrier layer (not illustrated) made of Mg-doped AlGaN is formed on the active layer 19, and then, p-GaN layer (a layer thickness of 50 nm) is film-formed on the electronic barrier layer to form the p-type semiconductor layer 21.

Next, a peripheral portion of the p-type semiconductor layer 21, the active layer 19, and the n-type semiconductor layer 17 is etched to form a mesa shape such that the upper surface 17S of the n-type semiconductor layer 17 is exposed in the peripheral portion. In other words, in this process, the semiconductor structure layer 15 including the column-shaped portion made of the n-type semiconductor layer 17, the active layer 19, and the p-type semiconductor layer 21 in FIG. 1 is completed.

Next, the groove 15G passing through the active layer 19 from the upper surface of the p-type semiconductor layer 21 is formed by etching. Subsequently, the insulating layer 25 is formed by forming a film of $SiO_2$ on the semiconductor structure layer 15 and removing a part of the film to form the opening 25H.

Next, the light transmissive electrode layer 31 is formed by forming film of ITO of 20 nm on the insulating layer 25, and then, the p-electrode 27 and the n-electrode 23 are formed by forming films of Au on the light transmissive electrode layer 31 and on the upper surface 17S of the n-type semiconductor layer 17, respectively.

Next, $Nb_2O_5$ of 40 nm is film-formed as a spacer layer (not illustrated) on the p-electrode 27 and the light transmissive electrode layer 31, and then, by forming a film of 10.5 pairs of layers made of $Nb_2O_5/SiO_2$ in one pair on the spacer layer, the second multilayer reflector 29 is formed.

Next, the back surface of the substrate 11 is polished, and then, by forming an AR coating made of $Nb_2O_5/SiO_2$ on the polished surface, the surface emitting laser 10 is completed.

Embodiment 2

The following describes a surface emitting laser 40 as Embodiment 2 of the present invention. The surface emitting laser 40 is different from the surface emitting laser 10 in that the groove 15G of the semiconductor structure layer 15 is formed outside the second multilayer reflector 29 in top view.

Figure 4:
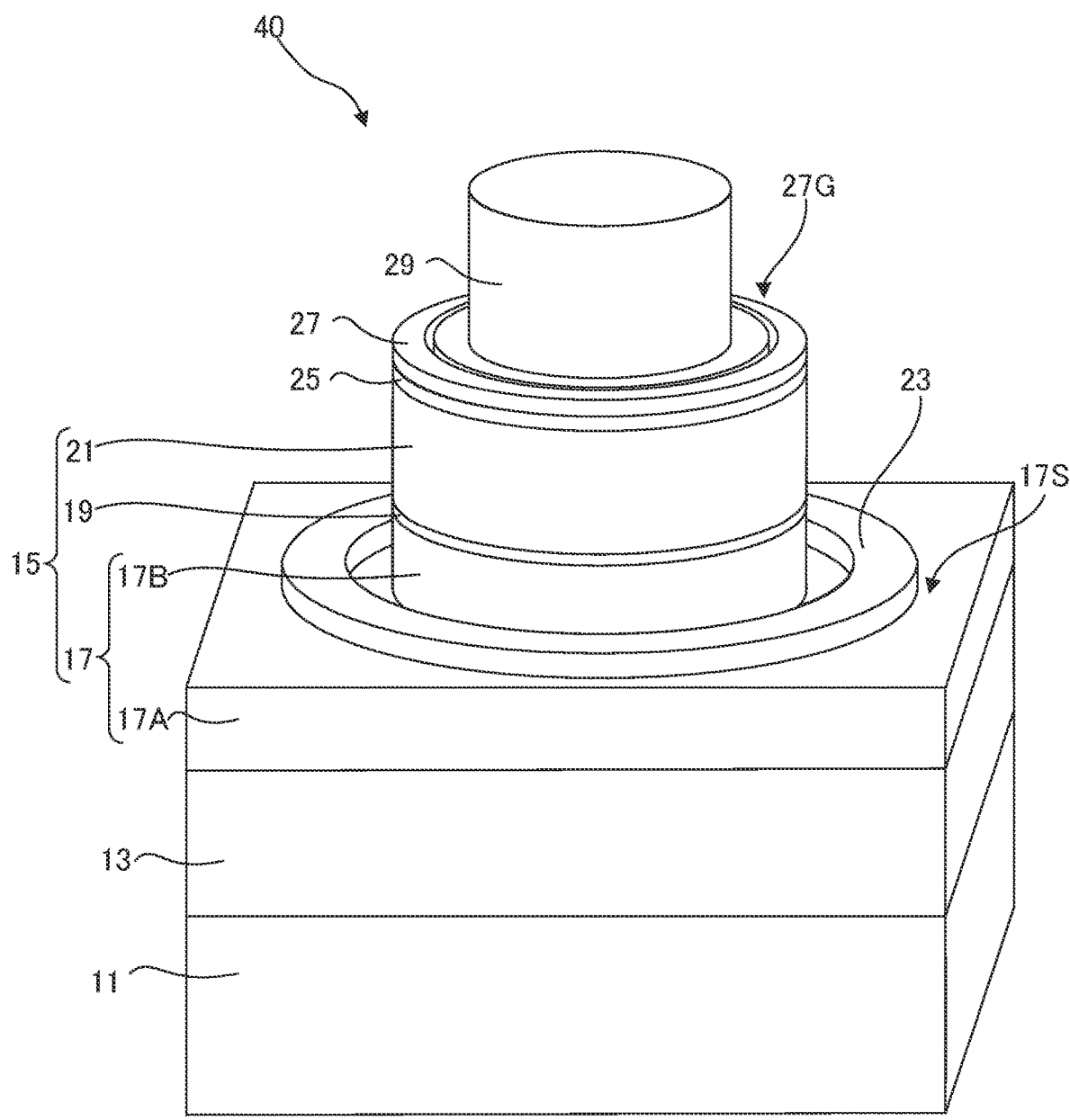
FIG. 4 is a perspective view of a surface emitting laser according to a second embodiment.
Figure 5:
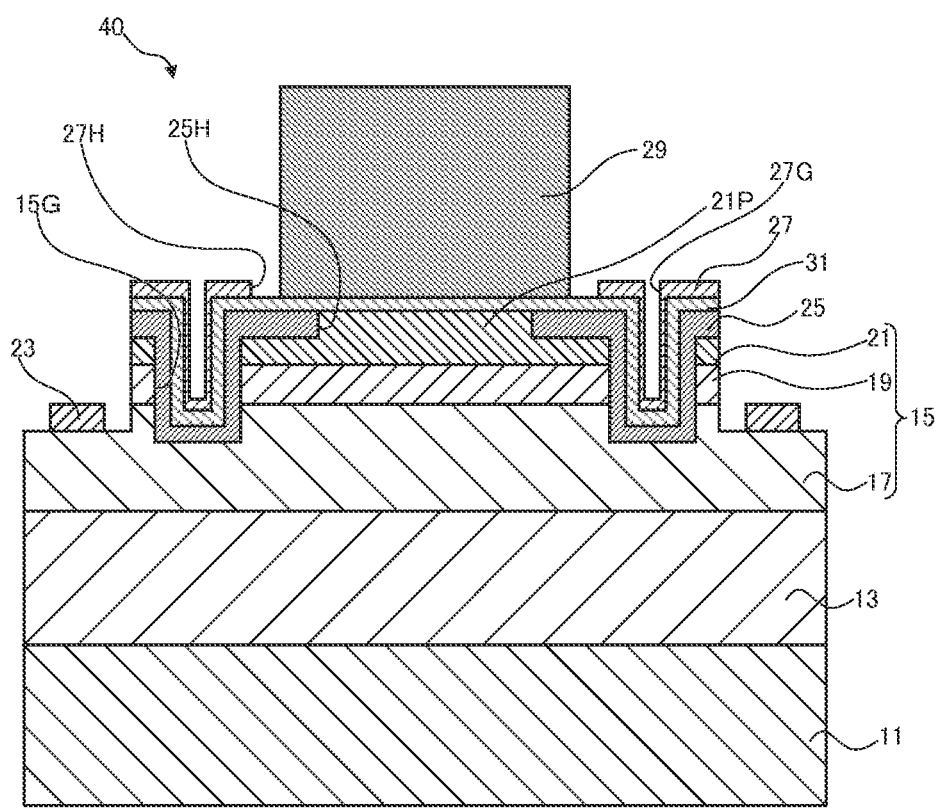
FIG. 5 is a cross-sectional view of the surface emitting laser according to the second embodiment.

FIG. 4 illustrates a perspective view of the surface emitting laser 40 according to Embodiment 2. FIG. 5 illustrates a cross-sectional view of the surface emitting laser 40 cut along a cross section similar to the one illustrated in Embodiment 1 described above. As illustrated in FIG. 4 and FIG. 5, in the surface emitting laser 40, the groove 15G of the semiconductor structure layer 15 is formed outside the second multilayer reflector 29 on the upper surface of the p-type semiconductor layer 21. That is, on the upper surface of the p-type semiconductor layer 21, the groove 15G is exposed from a second formation region.

On an upper surface of the p-electrode 27 formed on the p-type semiconductor layer 21 via the insulating layer 25, a groove structure 27G formed by inheriting the shape of the groove 15G is formed. That is, the groove structure 27G is formed on the groove 15G in a shape approximately identical to that of the groove 15G.

As illustrated in FIG. 5, also in the surface emitting laser 40, similarly to the surface emitting laser 10, the groove 15G that reaches the active layer 19 from the upper surface of the p-type semiconductor layer 21 is formed in the semiconductor structure layer 15. With this groove 15G, the distortion generated in the in-layer direction of the active layer 19 is reduced in the active layer 19, and the internal quantum efficiency in the active layer 19 is improved, thereby ensuring achieving improved luminous efficiency. In the surface emitting laser 40, it is not necessary to form the second multilayer reflector 29 on the p-electrode 27. That is, since it is not necessary to form the second multilayer reflector 29 across a level difference, it is possible to further enhance accuracy of formation of the second multilayer reflector 29.

Embodiment 3

The following describes a surface emitting laser 50 as Embodiment 3 of the present invention. The surface emitting laser 50 is different from the surface emitting laser 10 in that the electrode connected to the n-type semiconductor layer 17 is disposed on the back surface of the substrate 51 or the like.

Figure 6:
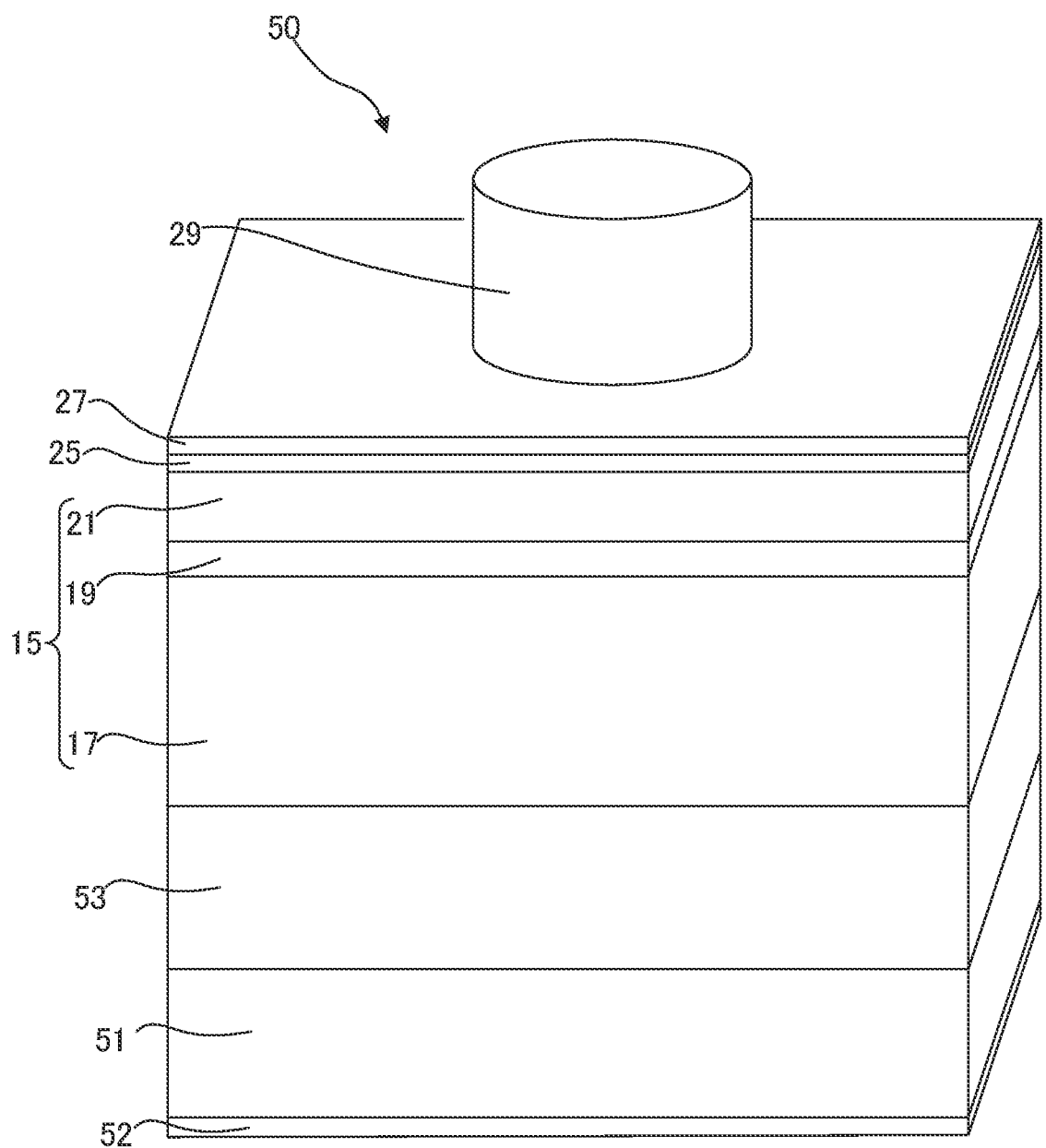
FIG. 6 is a perspective view of a surface emitting laser according to a third embodiment.

FIG. 6 is a perspective view of the surface emitting laser 50. A substrate 51 is, for example, a substrate having a rectangular upper surface shape. The substrate 51 is a substrate made of a conductive material such as n-GaN. On a back surface of the substrate 51, an n-electrode 52 made of metal is formed.

On the substrate 51, a first multilayer reflector 53 made of a semiconductor layer that has been grown on the substrate 51 is formed. The first multilayer reflector 53 is a semiconductor multilayer reflector with conductivity in which a low refractive-index semiconductor film having a composition of AlInN and a high refractive-index semiconductor film having an n-GaN composition and having a refractive index higher than that of the low refractive-index semiconductor film are alternately laminated. In other words, the first multilayer reflector 53 is the Distributed Bragg Reflector (DBR) made of a semiconductor material. For example, on an upper surface of the substrate 51, a buffer layer having an n-GaN composition is disposed, and alternately forming films of the high refractive-index semiconductor film and the low refractive-index semiconductor film described above on the buffer layer forms the first multilayer reflector 53.

The semiconductor structure layer 15 is a laminated structure made of a plurality of semiconductor layers formed on the first multilayer reflector 53. The semiconductor structure layer 15 has the n-type semiconductor layer (the first semiconductor layer) 17 formed on the first multilayer reflector 53, the light-emitting layer (or the active layer) 19 formed on the n-type semiconductor layer 17, and the p-type semiconductor layer (the second semiconductor layer) 21 formed on the active layer 19.

The n-type semiconductor layer 17 is a semiconductor layer formed on the first multilayer reflector 53. The n-type semiconductor layer 17 is a semiconductor layer that has the GaN composition and is doped with Si as n-type impurities.

The active layer 19 is a layer that is formed on the n-type semiconductor layer 17 and has the quantum well structure including the well layer having the InGaN composition and the barrier layer having the GaN composition. In the surface emitting laser 50, a light is generated in the active layer 19.

The p-type semiconductor layer 21 is a semiconductor layer having the GaN composition formed on the active layer 19. The p-type semiconductor layer 21 is doped with Mg as p-type impurities.

The insulating layer 25 is a layer made of the insulator formed on the p-type semiconductor layer 21. The insulating layer 25 is formed of, for example, a substance having a refractive index lower than that of the material forming the p-type semiconductor layer 21, such as $SiO_2$. The insulating layer 25 is formed into a ring shape on the p-type semiconductor layer 21 and is provided with the opening (not illustrated) that exposes the p-type semiconductor layer 21 at the center portion.

The p-electrode 27 is a metal electrode formed on the insulating layer 25. The p-electrode 27 is electrically connected to the upper surface of the p-type semiconductor layer 21 exposed from the above-described opening of the insulating layer 25 via the transparent electrode (not illustrated) made of the metal oxide film, such as ITO or IZO.

The second multilayer reflector 29 is a dielectric multilayer reflector in which the low refractive index dielectric film made of $Al_2O_3$ and the high refractive index dielectric film made of $Ta_2O_5$ and having a refractive index higher than that of the low refractive index dielectric film are alternately laminated. In other words, the second multilayer reflector 29 is the Distributed Bragg Reflector (DBR) made of a dielectric material.

Figure 7:
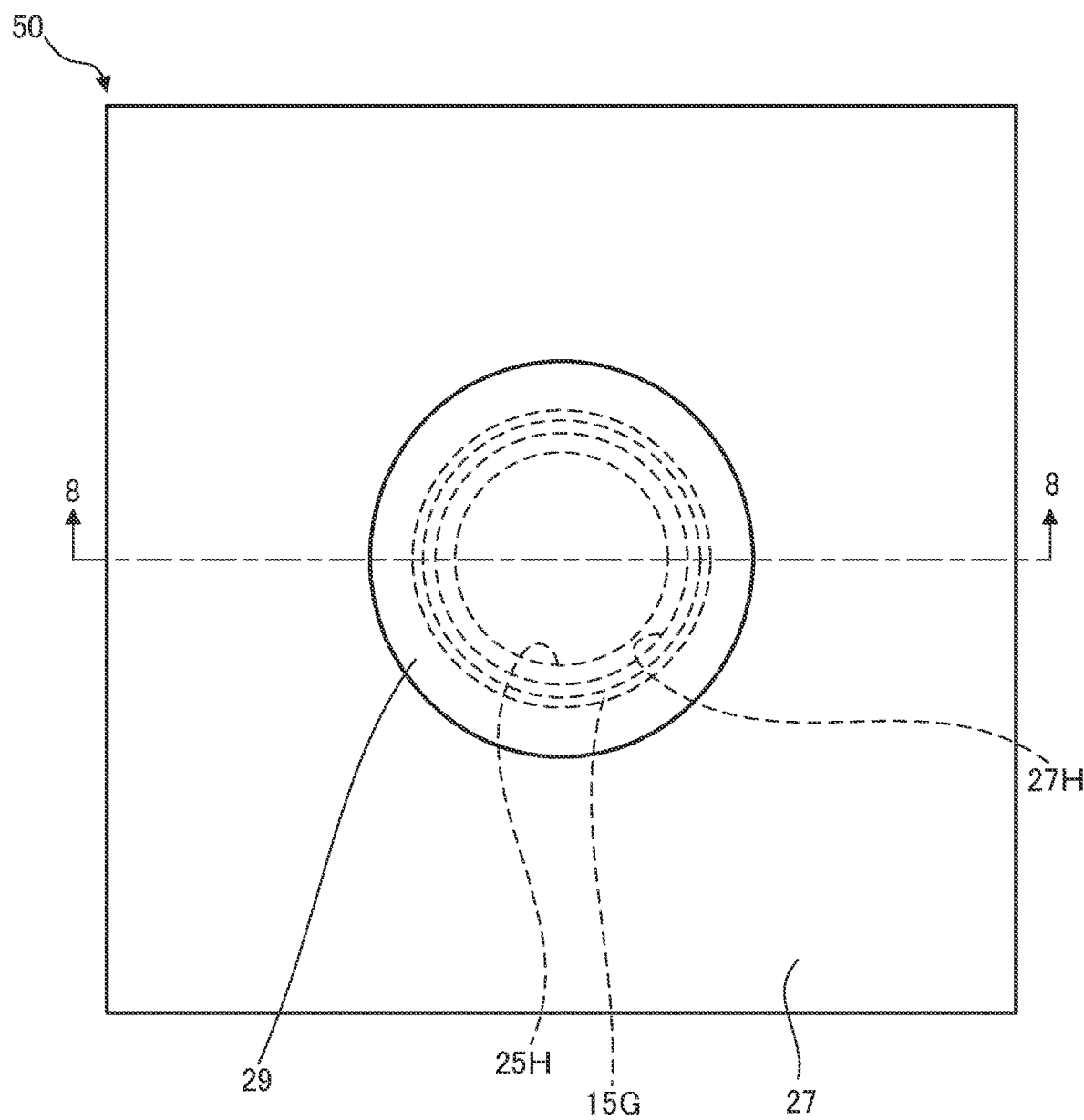
FIG. 7 is a top view of the surface emitting laser according to the third embodiment.

FIG. 7 is a top view of the surface emitting laser 50. As described above, the surface emitting laser 50 has the semiconductor structure layer 15 including the n-type semiconductor layer 17 formed above the substrate 51 having the rectangular upper surface shape, the active layer 19, and the p-type semiconductor layer 21 (see FIG. 6). On the p-type semiconductor layer 21, the insulating layer 25 and the p-electrode 27 are formed. On the p-electrode 27, the second multilayer reflector 29 is formed.

The insulating layer 25 has the opening 25H as a circular-shaped opening that exposes the p-type semiconductor layer 21 of the above-described insulating layer 25. As illustrated in FIG. 7, the opening 25H is formed at the center of the insulating layer 25 when viewed from an upper surface of the surface emitting laser 10 and is covered with the second multilayer reflector 29 when viewed from the upper surface of the surface emitting laser 10. In other words, the opening 25H is covered with the second multilayer reflector 29 on the upper surface of the p-type semiconductor layer 21. Yet in other words, the opening 25H is disposed in a region opposed to the lower surface of the multilayer reflector 29 of the upper surface of the p-type semiconductor layer 21.

The p-electrode 27 is formed at the center of the insulating layer 25 when viewed from the upper surface of the surface emitting laser 50 and has the opening 27H that surrounds the opening 25H. That is, the opening 27H is an opening larger than the opening 25H. For example, the opening 27H has a circular shape concentric to the shape of the opening 25H.

As illustrated by the dashed line in FIG. 7, a groove 15G in a circular ring shape is formed on the upper surface of the p-type semiconductor layer 21, that is, on the upper surface of the semiconductor structure layer 15. The groove 15G is formed in an outside region of the opening 25H and the opening 27H. In this embodiment, the groove 15G is formed so as to be covered with the second multilayer reflector 29 on the upper surface of the p-type semiconductor layer 21. That is, in this embodiment, the groove 15G is formed at a position opposed to the lower surface of the second multilayer reflector 29.

Figure 8:
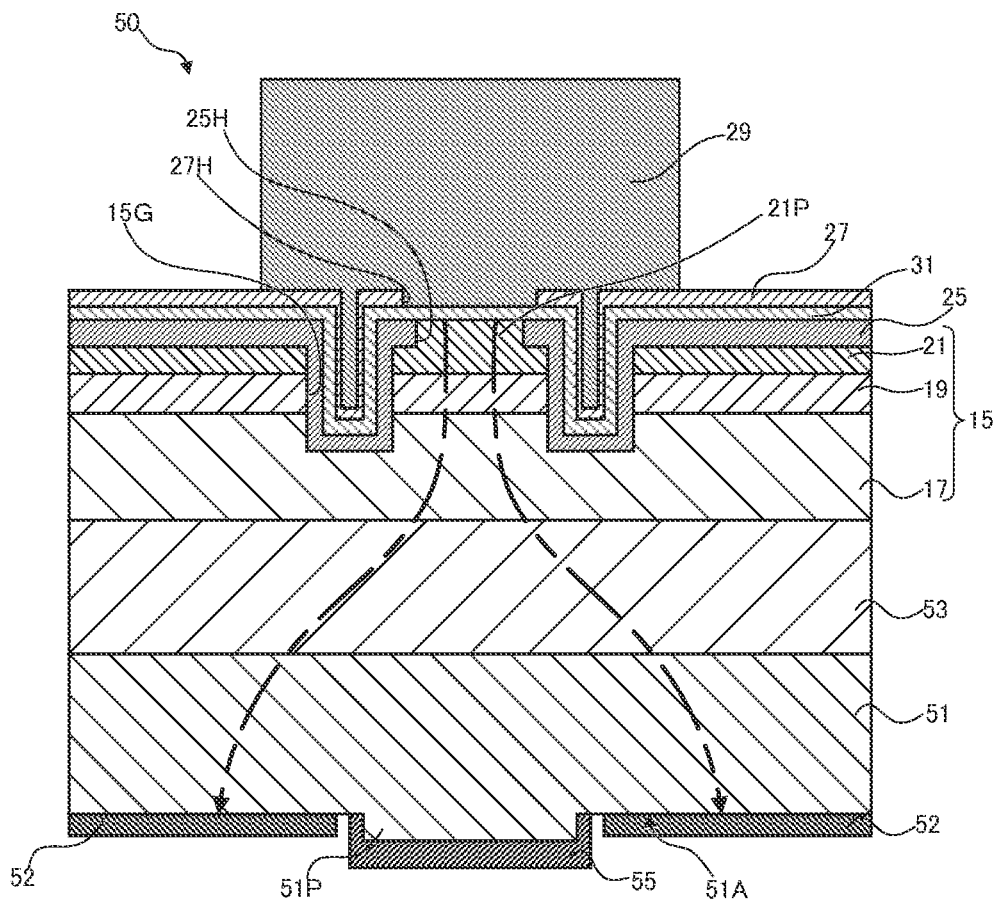
FIG. 8 is a cross-sectional view of the surface emitting laser according to the third embodiment.

FIG. 8 is a cross-sectional view of the surface emitting laser 50 taken along the line 8-8 in FIG. 7. As described above, the surface emitting laser 50 has the substrate 51 as the n-GaN substrate, and the first multilayer reflector 53 is formed on the substrate 51.

In a back surface 51A of the substrate 51, a projecting portion 51P is formed. The projecting portion 51P is formed in a region corresponding to the projecting portion 21P when viewed from a normal direction of the substrate 51. The projecting portion 51P is a protrusion remained due to a removal of a peripheral area of the projecting portion 51P by dry etching after the back surface 51A is polished. Accordingly, a top surface of the projecting portion 51P is a polished surface, and the peripheral region of the projecting portion 51P of the back surface 51A of the substrate 51 has a surface where the polished surface is dry-etched. The n-electrode 52 is formed in the peripheral region of the projecting portion 51P of the back surface 51A of the substrate 51, that is, in a region excluding the projecting portion 51P. Because the projecting portion 51P has a top surface serving as an opening through which the emitted light is emitted outside so as not to obstruct the emitted light by the n-electrode 52. That is, the projecting portion 51P has a structure in which it projects from the opening of the n-electrode 52.

An anti-reflection layer 55 is formed so as to cover the projecting portion 51P in the back surface 51A of the substrate 51. The anti-reflection layer 55 is made of, for example, a dielectric multilayer film, and has a structure, for example, in which $Ta_2O_5$ layers and $SiO_2$ layers are alternately laminated a plurality of times. The anti-reflection layer 55 is a so-called AR coating that suppresses the light emitted from the active layer 19 from being reflected on the top surface of the projecting portion 51P of the substrate 51.

On the first multilayer reflector 53, the semiconductor structure layer 15 is formed. The semiconductor structure layer 15 is a laminated structure made by forming the n-type semiconductor layer 17, the active layer 19, and the p-type semiconductor layer 21 in this order.

The p-type semiconductor layer 21 has the projecting portion 21P projecting upward in a columnar shape at the center of the upper surface of the p-type semiconductor layer 21. The groove 15G formed in the semiconductor structure layer 15 is formed so as to surround the projecting portion 21P on the upper surface of the p-type semiconductor layer 21 and passes through the active layer 19 from the upper surface of the p-type semiconductor layer 21 to reach the n-type semiconductor layer 17.

Thus, in the surface emitting laser 50 according to Embodiment 3, similarly to the surface emitting lasers 10 and 40 in the above-described embodiments, the groove 15G is formed so as to pass through the active layer 19. In other words, the groove 15G forms the clearance in the active layer 19.

The insulating layer 25 is formed so as to cover the upper surface of the p-type semiconductor layer 21 and the inner surface of the groove 15G. As described above, the insulating layer 25 is made of a material having a refractive index lower than that of the p-type semiconductor layer 21. The insulating layer 25 has the opening 25H that exposes the projecting portion 21P. For example, as illustrated in FIG. 7, the opening 25H is in a circular shape. For example, the opening 25H and the projecting portion 21P have similar shapes, and the inner surface of the opening 25H and the outer surface of the projecting portion 21P are in contact with one another.

The light transmissive electrode layer 31 is a layer made of a conductive body having translucency formed to cover the insulating layer 25 and the projecting portion 21P exposed from the opening 25H of the insulating layer 25. The light transmissive electrode layer 31 is formed of, for example, a metal oxide having translucency relative to the emitted light from the active layer 19, such as ITO or IZO.

As described above, the p-electrode 27 is the metal electrode and is formed so as to cover the light transmissive electrode layer 31. The p-electrode 27 has the opening 27H that exposes the light transmissive electrode layer 31 at the center. The opening 27H is an opening with a width larger than that of the opening 25H.

The second multilayer reflector 29 is formed so as to cover the opening 27H and the groove 15G. The second multilayer reflector 29 is formed so as to fill a space formed of the opening 27H and so as to be in contact with the light transmissive electrode layer 31. The second multilayer reflector 29 is formed so as to fill a space formed of the groove 15G.

In the surface emitting laser 50, the first multilayer reflector 53 has reflectivity slightly lower than that of the second multilayer reflector 29. Accordingly, a part of the light resonated between the first multilayer reflector 53 and the second multilayer reflector 29 transmits through the first multilayer reflector 53 and the substrate 51 to be taken out to the outside.

As described above, in the surface emitting laser 50 according to Embodiment 3, the groove 15G is formed so as to pass through the active layer 19. In other words, the groove 15G forms the clearance in the active layer 19. The groove 15G is formed after the semiconductor structure layer 15 is formed. Afterwards, the insulating layer 25 is formed before the light transmissive electrode layer 31, the p-electrode 27, and the second multilayer reflector 29 are formed.

Accordingly, after the semiconductor structure layer 15 is formed, forming the groove 15G that reaches the active layer 19 forms the clearance in a direction along the in-plane direction of the active layer 19. This clearance reduces a distortion generated in the in-layer direction of the active layer 19 or in the in-plane direction of the semiconductor structure layer 15 when the active layer 19 is formed.

Specifically speaking, as described above, the active layer 19 has a crystalline structure distorted by the difference of lattice constants between InGaN and GaN forming the quantum well structure when the active layer 19 is formed, which causes the piezoelectric polarization so as to generate the piezoelectric field. This piezoelectric field lowers the recombination probability of the electrons and the hole injected to the light-emitting layer to lower the internal quantum efficiency.

In the surface emitting laser 50, the groove 15G reaching the active layer 19 is formed in the semiconductor structure layer 15. The clearance by this groove is considered to reduce the distortion generated in the in-layer direction of the active layer 19 during the growth of the active layer 19, and thus, the internal quantum efficiency in the active layer 19 is improved.

Here, an operation of the surface emitting laser 50 will be described. In the surface emitting laser 50, when a voltage is applied between the n-electrode 52 and the p-electrode 27, a current flows inside the semiconductor structure layer 15 as indicated by the one-dot chain bold line in the drawing, and the light is emitted from the active layer 19. The light emitted from the active layer 19 is repeatedly reflected between the first multilayer reflector 53 and the second multilayer reflector 29 to reach a resonant state (to laser oscillate).

In the surface emitting laser 50, similarly to the case in the surface emitting laser 10, the current is injected only from a portion exposed by the opening 25H to the p-type semiconductor layer 21. Since the p-type semiconductor layer 21 is considerably thin, the current hardly spreads in the in-plane direction inside the p-type semiconductor layer 21, that is, the direction along the in-plane of the semiconductor structure layer 15. Accordingly, in the surface emitting laser 50, the current is supplied only to the region immediately below the opening 25H in the active layer 19, and the light is emitted only from this region. That is, in the surface emitting laser 50, the opening 25H has the current confinement structure that restricts the supply range of the current in the active layer 19.

As described above, in the embodiment, the first multilayer reflector 53 has the reflectivity slightly lower than that of the second multilayer reflector 29. Accordingly, a part of the light resonated between the first multilayer reflector 53 and the second multilayer reflector 29 transmits through the first multilayer reflector 53 and the substrate 51 to be taken out to the outside from the projecting portion 51P. Thus, the surface emitting laser 50 emits the light toward the direction perpendicular to the lower surface of the substrate 51 and the in-plane direction of the respective layers of the semiconductor structure layer 15.

The description of the luminescence center axis AX and the like will be omitted because it is the same as that of the surface emitting laser 10 according to Embodiment 1.

Exemplary configurations of respective layers of the first multilayer reflector 53, the semiconductor structure layer 15, and the second multilayer reflector 29 and exemplary dimensions of the groove 15G in the surface emitting laser 50 will be described. In the embodiment, the first multilayer reflector 53 is made of the n-GaN base layer of 1 µm and 42 pairs of n-GaN layers and AlInN layers formed on the surface of the substrate 51.

The n-type semiconductor layer 17 is the n-GaN layer doped with Si having a layer thickness of 1580 nm. The active layer 19 is made of an active layer having a multiple quantum well structure in which four pairs of GaInN layers of 4 nm and GaN layers of 5 nm are laminated. On the active layer 19, the AlGaN electronic barrier layer doped with Mg is formed, and the p-type semiconductor layer 21 made of the p-GaN layer of 50 nm is formed thereon. The second multilayer reflector 29 is a lamination of 10.5 pairs of $Nb_2O_5$ and $SiO_2$.

The groove portion 15G formed in the semiconductor structure layer 15 has an outer diameter of 20 µm, a depth of 120 nm, and a width of 1 µm. The light transmissive electrode layer 31 formed on the semiconductor structure layer 15 is a layer made of ITO of 20 nm, and the second multilayer reflector 29 is formed on the light transmissive electrode layer 31 and the p-electrode 27 with the spacer layer of $Nb_2O_5$ of 40 nm interposed.

The p-type semiconductor layer 21 may have a layer thickness of 50 nm in the projecting portion 21P and a layer thickness of 30 nm in the other regions. That is, the p-type semiconductor layer 21 may have different layer thicknesses in the projecting portion 21P and the other regions. The insulating layer 25 has an upper surface configured to be arranged at a height position identical to the upper surface of the projecting portion 21P of the p-type semiconductor layer 21. These are merely one example.

Description of the optical features inside the surface emitting laser 50 is omitted because it is similar to the optical features of the surface emitting laser 10.

As described above, similarly to the surface emitting laser 10 according to Embodiment 1, in the surface emitting laser 50 of the embodiment, the groove 15G that reaches the active layer 19 from the upper surface of the p-type semiconductor layer 21 is formed in the semiconductor structure layer 15. With this groove 15G, the distortion generated in the in-layer direction of the active layer 19 is reduced in the active layer 19, and the internal quantum efficiency in the active layer 19 is improved, thereby ensuring achieving improved luminous efficiency.

Embodiment 4

The following describes a surface emitting laser 60 according to Embodiment 4 of the present invention. The surface emitting laser 60 is different from the surface emitting laser 50 in that the groove 15G of the semiconductor structure layer 15 is formed on an outside of the second multilayer reflector 29 in top view.

Figure 9:
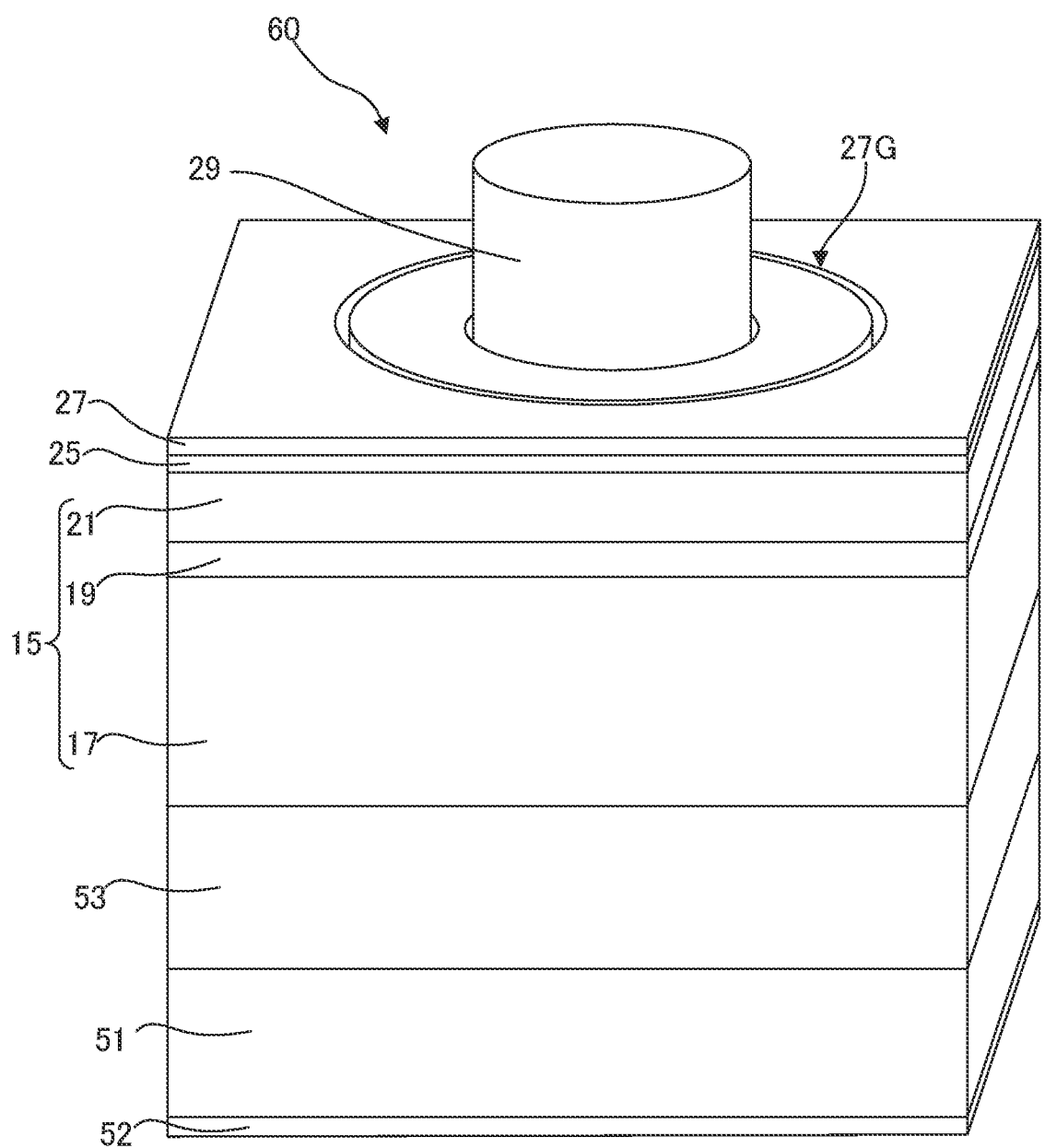
FIG. 9 is a perspective view of a surface emitting laser according to a fourth embodiment.
Figure 10:
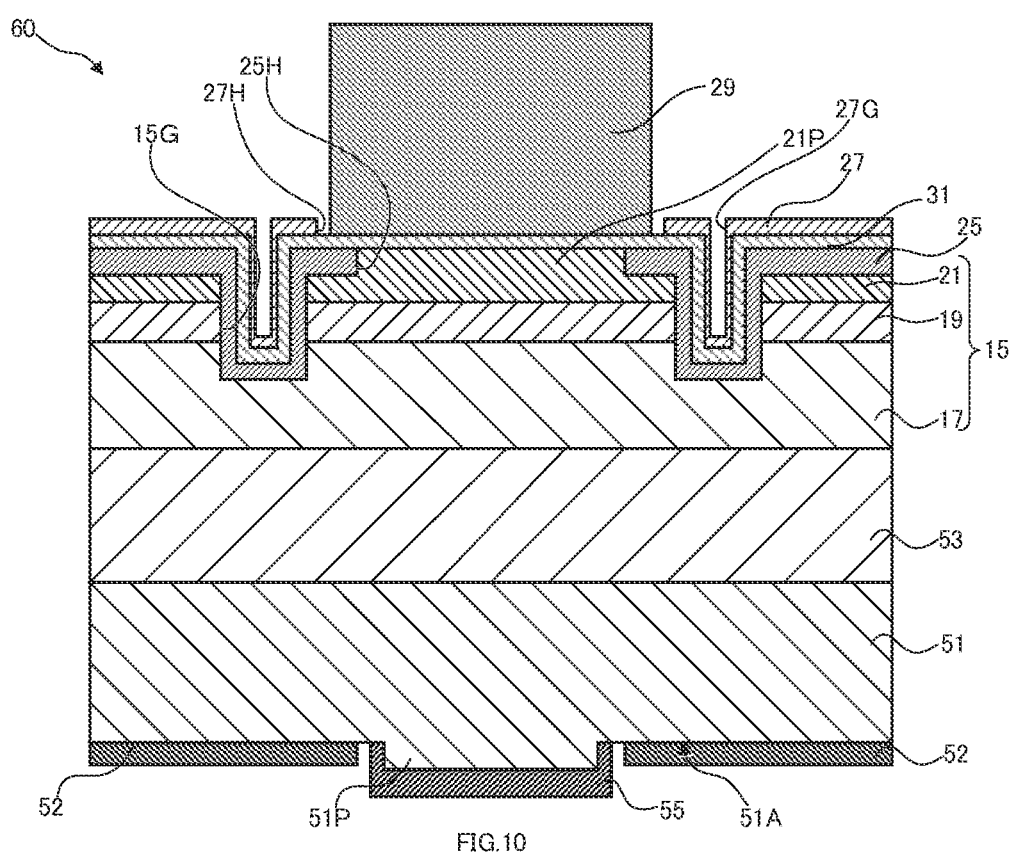
FIG. 10 is a cross-sectional view of the surface emitting laser according to the fourth embodiment.

FIG. 9 illustrates a perspective view of the surface emitting laser 60 according to Embodiment 4. FIG. 10 illustrates a cross-sectional view of the surface emitting laser 60 cut along a cross section similar to the one illustrated in Embodiment 3 described above. As illustrated in FIG. 9 and FIG. 10, in the surface emitting laser 60, the groove 15G of the semiconductor structure layer 15 is formed outside the second multilayer reflector 29 on the upper surface of the p-type semiconductor layer 21. That is, on the upper surface of the p-type semiconductor layer 21, the groove 15G is exposed on the outside of the second multilayer reflector.

On the upper surface of the p-electrode 27 formed on the p-type semiconductor layer 21 via the insulating layer 25, the groove structure 27G formed by inheriting the shape of the groove 15G is formed. That is, the groove structure 27G is formed on the groove 15G in a shape approximately identical to that of the groove 15G. As illustrated in FIG. 10, also in the surface emitting laser 60, similarly to the surface emitting laser 10, the groove 15G that reaches the n-type semiconductor layer 17 from the upper surface of the p-type semiconductor layer 21 is formed in the semiconductor structure layer 15. With this groove 15G, the distortion generated in the in-layer direction of the active layer 19 is reduced in the active layer 19, and the internal quantum efficiency, for example, slope efficiency in the active layer 19 is improved, thereby ensuring achieving improved luminous efficiency. Note that, in the surface emitting laser 60, it is not necessary to form the second multilayer reflector 29 on the p-electrode 27. That is, since it is not necessary to form the second multilayer reflector 29 across the level difference, it is possible to further enhance accuracy of formation of the second multilayer reflector 29.

(Modification of Semiconductor Structure Layer)

In the above-described embodiments, a case where the groove 15G formed in the semiconductor structure layer 15 has a circular ring shape has been described. However, the groove 15G may have other shapes.

Figure 11:
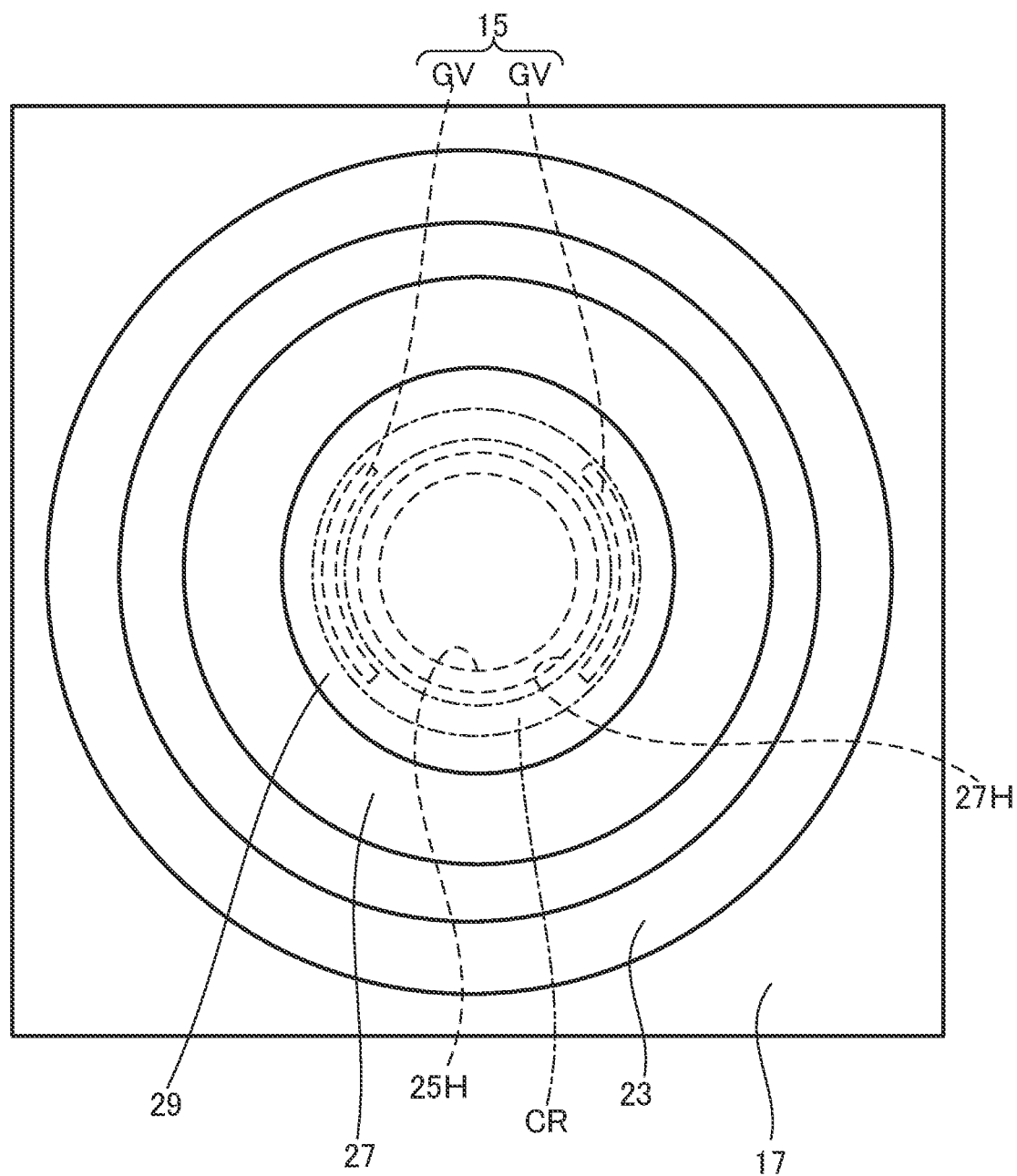
FIG. 11 is a top view of a surface emitting laser according to a modification.

For example, as illustrated in FIG. 11, the groove 15G may be a groove structure including a recessed portion GV (or a groove GV) formed intermittently instead of a perfect ring in a ring-shaped region CR (the region enclosed by the one-dot chain line in the drawing). That is, the groove 15G may have a recessed structure including a plurality of recessed portions. In other words, the groove 15G may have a ring-shaped structure formed intermittently. For example, the groove 15G may have an intermittently formed ring-shaped structure that surrounds a region exposed by the opening 25H of the upper surface of the p-type semiconductor layer 21.

Note that, when the groove 15G is formed by a plurality of recessed portions, to equally reduce the distortion in the active layer 19, the plurality of recessed portions are preferably formed in two or more directions when viewed from the above-described luminescence center axis AX. That is, when the groove 15G is formed by the plurality of recessed portions, in top view of the surface emitting laser 10, the recessed portions are preferably formed in two or more directions when viewed from the light emission region including the luminescence center axis AX and have a structure that sandwiches the light emission region between the recessed portions. To equally reduce the distortion in the active layer 19, the recessed portions forming the groove 15G are further preferably disposed rotationally symmetrically with respect to the luminescence center axis AX. In other words, the recessed portions forming the groove 15G are preferably disposed rotationally symmetrically when viewed from a direction perpendicular to the in-plane direction of the semiconductor structure layer 15.

Note that, as described above, it is also possible to make a degree of reduction of the distortion in the active layer 19 anisotropic to control polarization of the light emitted from the surface emitting laser of the above-described embodiments by changing the shape of the groove 15G, for example, by forming the groove 15G with the plurality of recessed portions. For example, in the case of the surface emitting laser illustrated in FIG. 11, when viewed from the opening 25H, that is, from the central region CA, the distortion of the active layer 19 is further reduced in a direction where the recessed portion GV forming the groove 15G exists. This allows increasing an optical gain in a direction (the right-left direction in the drawing) where the recessed portion GV forming the groove 15G exists when viewed from the opening 25H and obtaining a large amount of light having a polarization direction along the direction.

To reduce the distortion of the above-described active layer 19 and to make a degree of reduction of the above-described distortion anisotropic to control the polarization of the light emitted from the surface emitting laser, the groove 15G is preferably formed near the luminescence center axis AX. Accordingly, for example, like the surface emitting laser 10 according to Embodiment 1 and the surface emitting laser 50 according to Embodiment 3, the groove 15G is preferably formed below the second multilayer reflector 29. Note that, to reduce the distortion of the active layer 19, the groove 15G or the plurality of grooves GV are preferably formed, for example, at a distance within 50 μm from an outer edge of the light emission region. That is, the ring-shaped region CR forming the groove 15G is preferably disposed at a distance within 50 μm from the outer edge of the light emission region or the central region CA.

In the above-described embodiment, while the case where a circular-shaped laser light is emitted from the surface emitting laser has been described as an example, a configuration in which a ring-shaped laser light is emitted may be employed. That is, when viewed from above the surface emitting laser of the above-described embodiment, a circular-shaped insulating layer may be formed at the center of the opening 25H of the insulating layer 25. Yet in other words, the insulating layer 25 may have a circular ring-shaped hole portion, and via the circular ring-shaped hole portion, the upper surface of the p-type semiconductor layer 21 may be exposed, and the light transmissive electrode layer 31 and the p-type semiconductor layer 21 may be electrically in contact with one another.

In that case, an inside recessed portion IG may be further formed inside the groove 15G of the semiconductor structure layer 15. This recessed portion IG also passes through the active layer 19 from the upper surface of the p-type semiconductor layer 21 similarly to the groove 15G.

Figure 12:
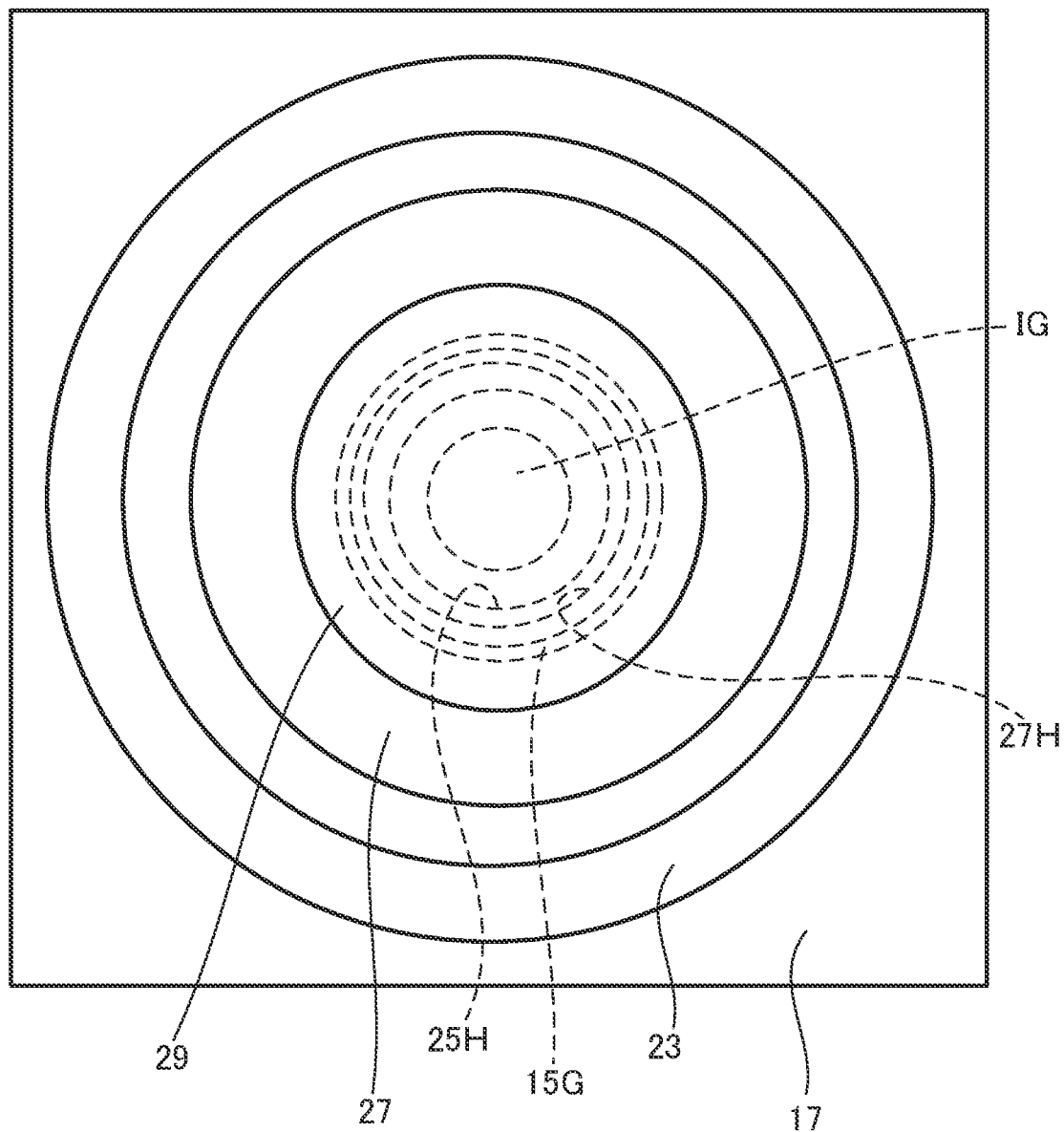
FIG. 12 is a top view of a surface emitting laser according to a modification.
Figure 13:
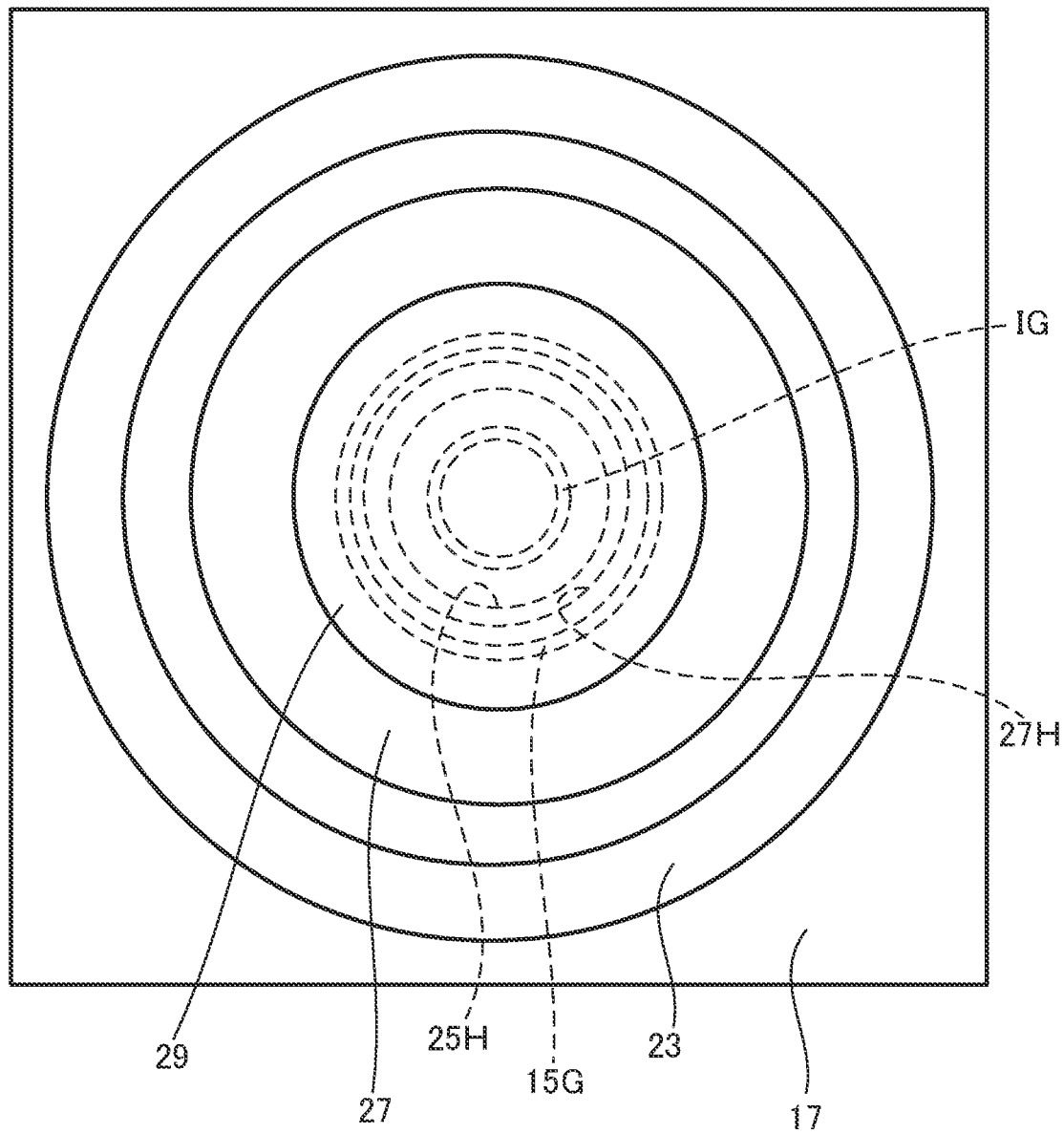
FIG. 13 is a top view of a surface emitting laser according to a modification.

FIG. 12 is a top view of a modification in which a column-shaped inside recessed portion IG is formed in the surface emitting laser 10 according to Embodiment 1. FIG. 13 is a top view of a modification in which a cylindrical-shaped inside recessed portion IG is formed in the surface emitting laser 10 according to Embodiment 1. Thus, forming the inside recessed portion IG allows further reducing the distortion of the active layer 19.

Embodiment 5

The following describes a surface emitting laser 70 according to Embodiment 5 of the present invention. The surface emitting laser 70 of this embodiment is different from the surface emitting laser 10 according to Embodiment 1 in that a C-plane GaN substrate that is inclined (offset) in a m-plane (1-100) direction from c-plane is used as the substrate 11 and an aspect of the groove 15G is different. Note that the surface emitting laser 70 can be formed by a manufacturing method similar to that of the surface emitting laser 10 according to Embodiment 1.

Figure 14:
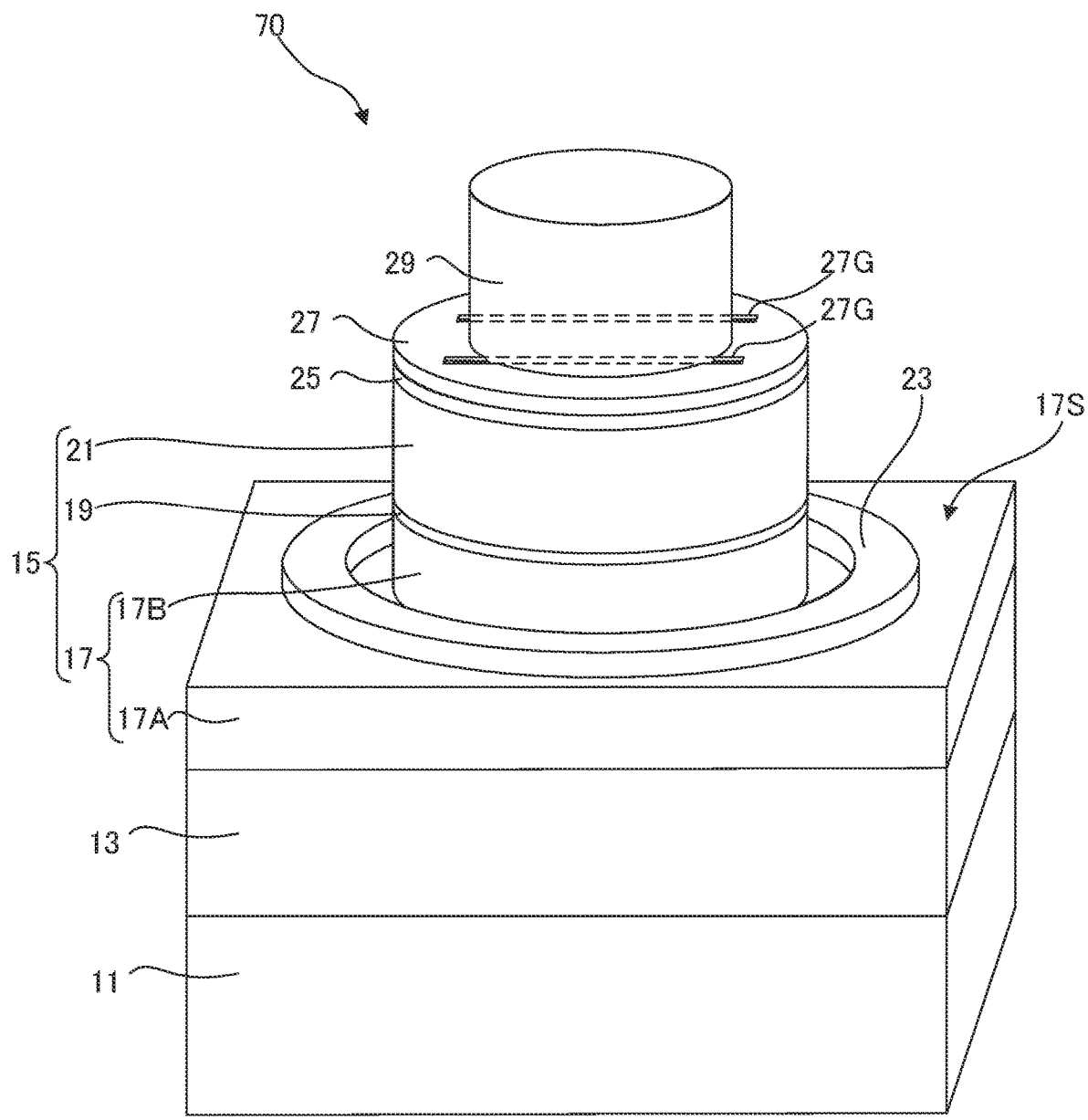
FIG. 14 is a perspective view of a surface emitting laser according to a fifth embodiment.
Figure 15:
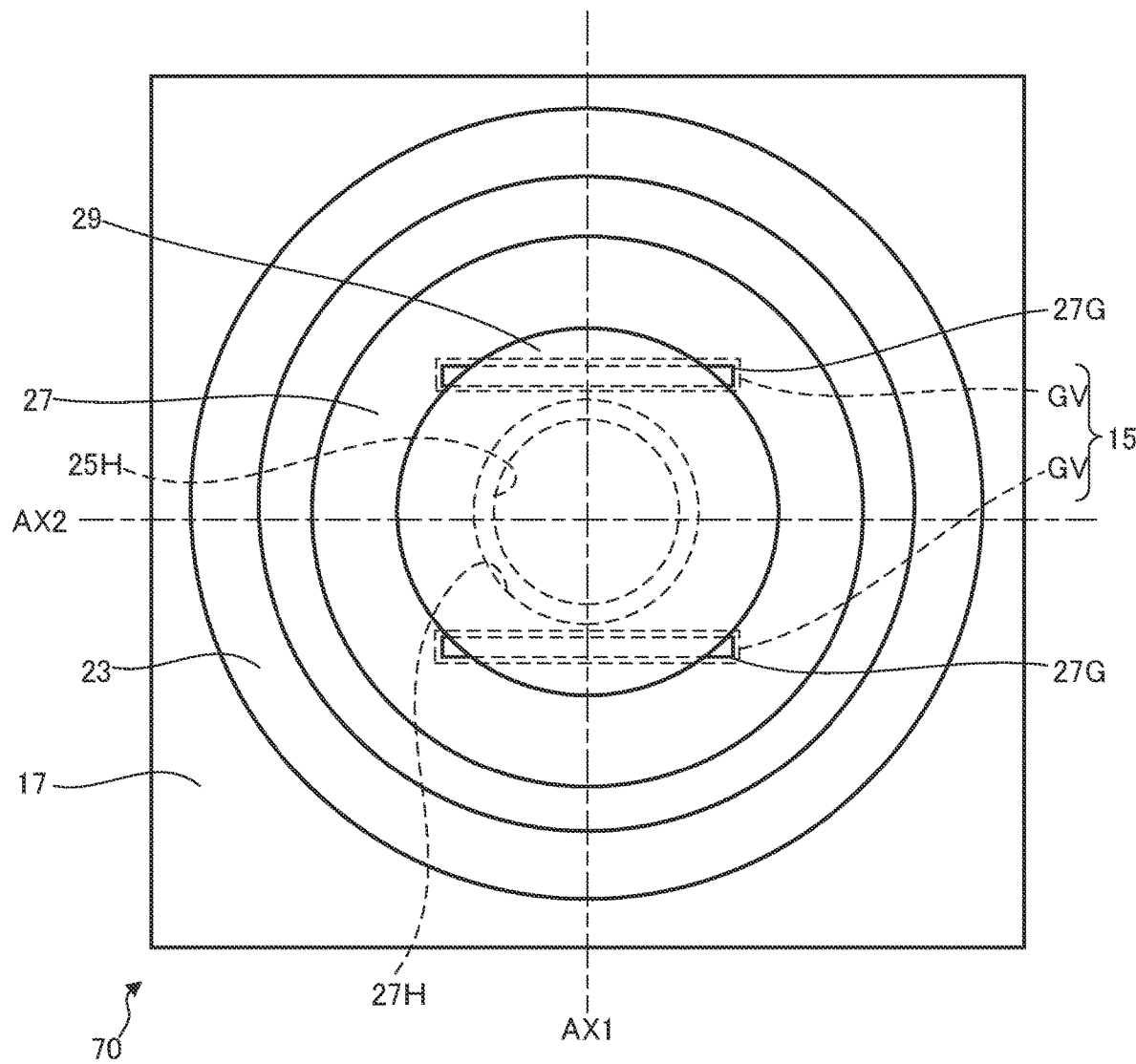
FIG. 15 is a top view of the surface emitting laser according to the fifth embodiment.

FIG. 14 is a perspective view when viewed from obliquely above in front of the surface emitting laser 70. FIG. 15 is a top view of the surface emitting laser 70. As described above, the surface emitting laser 70 has the substrate 11 whose upper surface is a surface that is offset to the m-plane from the c-plane of a GaN crystal plane.

Specifically, the upper surface of the substrate 11 is a surface that is inclined by 0.4° toward the m-plane direction from the c-plane. In other words, the substrate 11 is a GaN substrate having a principal surface that is offset by 0.4° toward the m-plane from the c-plane. Note that, in FIG. 15, an axis AX1 is an axis along an m-axis direction perpendicular to the m-plane of the substrate 11 and in the in-plane including the upper surface of the substrate 11, and an axis AX2 is an axis that is perpendicular to the axis AX1 and in the in-plane including the upper surface of the substrate 11.

In the surface emitting laser 70, the grooves 15G are constituted of two grooves GV extending parallel to one another along the axis AX2. In other words, the grooves 15G are constituted of two grooves GV extending with the axis AX2 interposed. That is, in the direction along the axis AX1, the grooves 15G are disposed so as to sandwich the opening 25H of the insulating layer 25 that overlaps with the light emission region of the active layer 19.

On the upper surface of the p-type semiconductor layer 21, each of the grooves GV extends from a region immediately below the second multilayer reflector 29 up to an outside of the second multilayer reflector 29. In other words, both end portions of the respective grooves GV are disposed outside the second multilayer reflector 29. Accordingly, the groove structures 27G having shapes similar to the grooves 15G also extend from the region immediately below the second multilayer reflector 29 up to the outside of the second multilayer reflector 29.

In the surface emitting laser 70, no groove GV is formed in a region in the direction along the axis AX2 when viewed from the opening 25H. That is, in the surface emitting laser 70, the grooves GV are formed only in the region in the direction along the axis AX1 when viewed from the opening 25H.

The following describes the polarization direction of the emitted light in the surface emitting laser 70. When the semiconductor layer is grown in a growth surface offset to the m-plane of the substrate 11 like the surface emitting laser 70 of this embodiment, an optical gain having the polarization direction in the m-axis direction becomes larger than the other direction, and thus, the laser light having the polarization direction in the m-axis direction easily oscillates. Thus, in the light emitted from the central region CA of the surface emitting laser 70, a large amount of light has the polarization direction in the m-axis direction.

Furthermore, as described above, the surface emitting laser 70 has the groove structures 27G in which the grooves GV are formed only in the region in the direction along the axis AX1 along the m-axis direction when viewed from the opening 25H. Thus, in the direction in which the grooves GV are formed, that is, in the direction along the axis AX1 when viewed from the opening 25H, that is, the central region CA as the light emission region, the distortion of the active layer 19 is significantly reduced.

According to the surface emitting laser 70, this increases the gain around the direction along the axis AX1 along the m-axis direction and thus, and thus, in addition to an effect by the above-described offset, allows obtaining a large amount of laser light having the polarization direction in the direction along the m-axis direction. Note that, in obtaining the above-described offset effect, the upper surface of the substrate 11 is preferably inclined in a range of 0.1° to 0.5° from the c-plane toward the m-plane.

While the surface emitting laser 70 is formed by growing the semiconductor structure layer 15 by a method similar to that of the surface emitting laser 10 according to Embodiment 1 described above, by performing heat treatment after forming the groove 15G, it is possible to obtain a surface emitting laser capable of obtaining a larger amount of laser light having the polarization direction in the direction along the m-axis direction.

Specifically, after forming the groove 15G, before forming the insulating layer 25, performing heat treatment at temperature of, for example, 500° C. allows forming a surface emitting laser capable of obtaining a larger amount of laser light having the polarization direction in the direction along the m-axis direction. It is considered that this is because, in the p-type semiconductor layer 21, among current paths to the active layer 19, the heat treatment increases the conductivity in the current path in the direction along the axis AX1.

The increase of the conductivity in the current path in the direction along the axis AX1 is due to detachment of hydrogen from p-GaN forming the p-type semiconductor layer 21 exposed in the groove 15G and thus, the increase of the conductivity of the p-type semiconductor layer 21 around the portion exposed from the groove 15G.

In addition to the increase of the laser light with the polarization direction along the axis AX direction due to reduction of distortion of the active layer 19 in the axis AX1 and the offset of the growth surface of the substrate 11, performing the above-described heat treatment allows further increase of the laser light with the polarization direction along the axis AX direction in the surface emitting laser 70.

Note that it is only necessary that the heat treatment performed before forming the insulating layer 25 after forming the groove 15G is performed at a temperature where detachment of hydrogen from p-GaN forming the p-type semiconductor layer 21 is generated. Specifically, for example, to generate detachment of hydrogen from p-GaN, the heat treatment is preferably performed at equal to or more than 400° C.

To increase the effect of increasing the light having the polarization direction in the direction along the above-described axis AX1, the groove 15G is preferably formed to be symmetry with respect to the axis AX2. The groove 15G preferably has a shape along the outer edge of the light emission region. Accordingly, also in the surface emitting laser 70, as illustrated on FIG. 16, it is preferred that the groove 15G having a shape along an arc as illustrated in FIG. 11 is formed.

In the above-described embodiment, to reduce the distortion of the active layer 19, the groove 15G is preferably formed in the circular-shaped region of 50 μm or less from the outer edge/of the light emission region. For controlling the polarization direction of the above-described laser light, furthermore, the groove 15G is preferably formed in a region in which the active layer has emission intensity of 1.8% or less of an emission peak of the active layer when the surface emitting laser is viewed from above.

Figure 16:
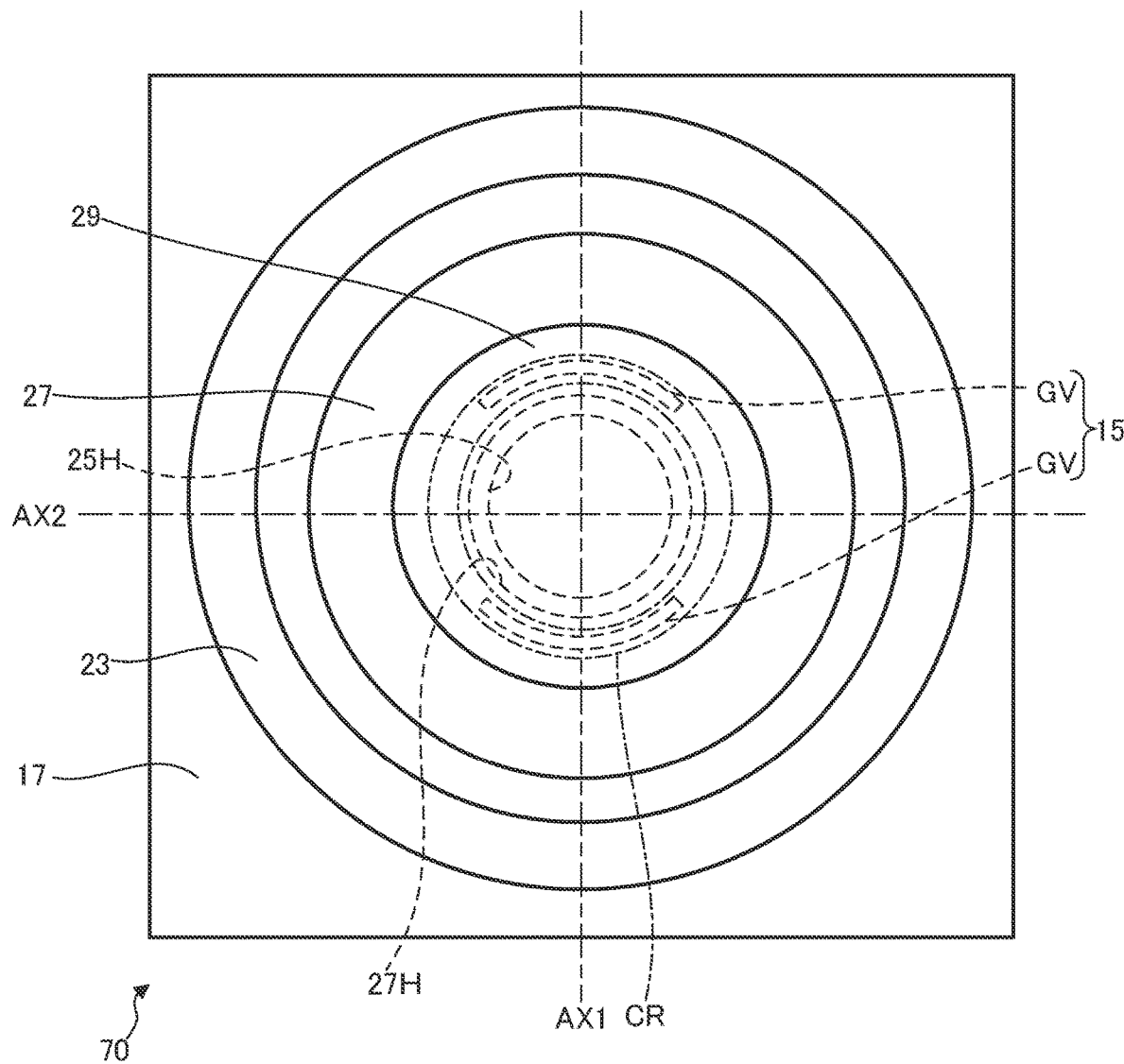
FIG. 16 is a top view of a surface emitting laser according to a modification.

In other words, it is preferred that the region to form the groove 15G, for example, the ring-shaped region CR in FIG. 16 is a region at a distance of 50 μm or less from the outer edge of the light emission region and is a region in which the active layer has the emission intensity of 1.8% or less of the emission peak of the active layer when the surface emitting laser is viewed from above.

This is because a confinement effect by the groove 15G that confines the light emitted from the active layer 19 inside the formation region of the groove 15G is not generated. Generation of the confinement effect fluctuates the polarization direction in directions other than the direction along the axis AX1 compared with a case where the confinement effect is not generated, and thus, it is preferable not to generate the confinement effect.

Note that the groove 15G is preferably formed so as not to overlap with the opening 25H in the direction along the axis AX2. Thus, generation of reduction of the distortion in the active layer 19 in the direction along the axis AX2 is suppressed and generation of the light having the polarization direction in the direction along the axis AX2 is reduced.

In other words, increasing a difference of reduction of the distortion in the active layer 19 between the direction along the axis AX1 and the direction along the axis AX2 to increase anisotropy of the reduction of the distortion allows increasing a proportion of the light having the polarization direction in the direction along the axis AX1 in the light emitted from the surface emitting laser 70.

Note that, while, in Embodiment 5, the case where the upper surface of the substrate 11 is offset from the c-plane to the m-plane as a non-polar plane has been described, the upper surface of the substrate 11 may be offset from the c-plane to an a-plane as the other non-polar plane. In that case, in the surface emitting laser 70 according to Embodiment 5, the axis AX1 becomes an axis along an a-axis and the groove GV is formed in a region in the direction along the axis AX1 when viewed from the opening 25H.

As described above, according to the surface emitting laser according to Embodiment 5, it becomes possible to obtain the light including a large amount of linearly polarized light having the polarization direction in a specific direction, that is, the light in which the polarization direction is aligned. Thus, since the emitted light itself from the surface emitting laser 70 according to Embodiment 5 is the light in which the polarization direction is aligned, it becomes possible to suppress loss of light to a minimum due to use of an optical system such as a liquid crystal or a polarization element and easily obtain a light having a specific polarization direction.

For example, the surface emitting laser such as the surface emitting laser 70 according to Embodiment 5 is useful when obtaining a sensor light that requires a light in which the polarization direction is aligned, for example, a light for communication such as Li-Fi.

In the above-described embodiment, while the insulating layer 25 is disposed to generate the current confinement by forming the insulating region and to form the region in which the refractive index is low, instead of disposing the insulating layer 25, the current confinement may be generated and a region in which the refractive index is low may be generated by another method. For example, by etching the surface of the semiconductor structure layer 15 where the insulating layer 25 is disposed in the above-described embodiment, an insulating region and a region in which the refractive index is low may be formed. By implanting ions on the surface of the semiconductor structure layer 15 where the insulating layer 25 is disposed, an insulating region and a region having a low refractive index may be formed to generate an effect similar to that of forming the insulating layer 25 in the above-described embodiment. When ion implantation is performed, for example, B ions, Al ions, or oxygen ions are implanted into the semiconductor structure layer 15.

In the surface emitting laser element as described above, the semiconductor structure layer 15 may be formed by laminating the p-GaN layer, an active layer similar to that of the above-described embodiment, and the n-GaN layer on the n-type semiconductor layer 17 in this order. In this case, in the p-GaN layer, a tunnel joining layer constituted of an $n^+$-GaN layer and a $p^+$-GaN may be formed in a portion where the central region CA of the above-described embodiment overlaps in top view in a region in contact with the n-type semiconductor layer 17.

In the semiconductor structure layer having this structure, a current flows from the p-GaN layer to the n-type semiconductor layer 17 only from a portion of the tunnel joining layer. Thus, it becomes possible to generate the current confinement similar to that of forming the above-described insulating layer 25.

Various values, dimensions, materials, and the like in Embodiments described above are merely examples and can be appropriately selected corresponding to the usage and the manufactured surface emitting laser.

DESCRIPTION OF REFERENCE SIGNS 10, 40, 50, 60, 70 Surface emitting laser
11, 51 Substrate
13, 53 First multilayer reflector
15 Semiconductor structure layer
17 N-type semiconductor layer
19 Active layer
21 P-type semiconductor layer
23, 52 n-electrode
25 Insulating layer
27 p-electrode
29 Second multilayer reflector
31 Light transmissive electrode layer

The invention claimed is:

1. A vertical cavity light-emitting element comprising:
a gallium-nitride-based semiconductor substrate;
a first multilayer reflector made of a nitride semiconductor formed on the substrate;
a semiconductor structure layer including a first semiconductor layer, an active layer, and a second semiconductor layer, the first semiconductor layer being made of a nitride semiconductor having a first conductivity type formed on the first multilayer reflector, the active layer being made of a nitride semiconductor formed on the first semiconductor layer, and the second semiconductor layer being formed on the active layer and made of a nitride semiconductor having a second conductivity type opposite to the first conductivity type;
a first electrode layer that is electrically in contact with the first semiconductor layer of the semiconductor structure layer;
a second electrode layer formed on an upper surface of the semiconductor structure layer, the second electrode layer being electrically in contact with the second semiconductor layer of the semiconductor structure layer in one region of the upper surface; and a second multilayer reflector formed to cover the one region on the second electrode layer, the second multilayer reflector constituting a resonator with the first multilayer reflector, wherein the semiconductor structure layer has one recessed structure including one or a plurality of recessed portions passing through the active layer from the upper surface in a region surrounding the one region, and wherein the recessed structure is disposed to overlap with the second multilayer reflector when viewed from a direction perpendicular to an in-plane direction of the semiconductor structure layer.

2. The vertical cavity light-emitting element according to claim 1, wherein the one or the plurality of recessed portions are rotationally symmetrically disposed when viewed from the direction perpendicular to the in-plane direction of the semiconductor structure layer.

3. The vertical cavity light-emitting element according to claim 1, wherein the one or the plurality of recessed portions comprise grooves disposed in a ring shape when viewed from the direction perpendicular to the in-plane direction of the semiconductor structure layer.

4. The vertical cavity light-emitting element according to claim 1, wherein a region outside the one region of the upper surface of the semiconductor structure layer and an inner surface of the one or the plurality of recessed portions are covered with an insulating layer.

5. The vertical cavity light-emitting element according to claim 1, wherein the one region of the upper surface of the semiconductor structure layer is a ring-shaped region and has another recessed structure including one or a plurality of recessed portions passing through the active layer from the upper surface inside the one region.

6. The vertical cavity light-emitting element according to claim 1, wherein:
the first semiconductor layer includes a mesa-shaped structure, and the mesa-shaped structure includes the active layer and the second semiconductor layer, and
the first electrode layer is disposed on an upper surface of the first semiconductor layer that exists around the mesa-shaped structure.

7. The vertical cavity light-emitting element according to claim 1, wherein:
the gallium-nitride-based semiconductor substrate has a first conductivity type, and
the first electrode layer is disposed on a surface on an opposite side of the semiconductor structure layer of the substrate and at a position excluding a region corresponding to the one region when viewed from a normal direction of the substrate.

8. The vertical cavity light-emitting element according to claim 7, wherein:
the first electrode layer has a shape including an opening in a region corresponding to the one region when viewed from the normal direction of the substrate, and
the gallium-nitride-based semiconductor substrate has a projecting portion in which a part of the substrate projects from the opening.

9. The vertical cavity light-emitting element according to claim 1, wherein the first multilayer reflector is formed on a C-plane of the gallium-nitride-based semiconductor substrate or on a surface offset by within 0.5° from the C-plane.

10. The vertical cavity light-emitting element according to claim 1, wherein the recessed structure is a ring-shaped structure constituted of a plurality of intermittently formed groove portions surrounding the one region.

11. A vertical cavity light-emitting element, comprising:
a gallium-nitride-based semiconductor substrate;
a first multilayer reflector made of a nitride semiconductor formed on the substrate;
a semiconductor structure layer including a first semiconductor layer, an active layer, and a second semiconductor layer, the first semiconductor layer being made of a nitride semiconductor having a first conductivity type formed on the first multilayer reflector, the active layer being made of a nitride semiconductor formed on the first semiconductor layer, and the second semiconductor layer being formed on the active layer and made of a nitride semiconductor having a second conductivity type opposite to the first conductivity type;
a first electrode layer that is electrically in contact with the first semiconductor layer of the semiconductor structure layer;
a second electrode layer formed on an upper surface of the semiconductor structure layer, the second electrode layer being electrically in contact with the second semiconductor layer of the semiconductor structure layer in one region of the upper surface; and
a second multilayer reflector formed to cover the one region on the second electrode layer, the second multilayer reflector constituting a resonator with the first multilayer reflector,
wherein the semiconductor structure layer has one recessed structure including one or a plurality of recessed portions passing through the active layer from the upper surface in a region surrounding the one region,
wherein a surface of the gallium-nitride-based semiconductor substrate on which the first multilayer reflector is formed is a surface offset from the c-plane to one crystal plane which is one of an m-plane and an a-plane, and
wherein one or a plurality of groove portions provided on the upper surface of the semiconductor structure layer extend to a region in a direction along one axis perpendicular to the one crystal plane when viewed from the one region and are uniform in a region in a direction perpendicular to the direction along the one axis.

12. The vertical cavity light-emitting element according to claim 11, wherein the one crystal plane is the m-plane.

13. The vertical cavity light-emitting element according to claim 11, wherein the one or the plurality of groove portions have a shape along an outer edge of the one region.

14. The vertical cavity light-emitting element according to claim 1, wherein the region surrounding the one region is a region having a distance of 50 µm or less from the outer edge of the one region and is a region in which an emission intensity of the active layer is 1.8% or less of a peak of the emission intensity of the active layer when the vertical cavity light-emitting element is viewed from above.

* * * * *